(12) United States Patent
Pierce et al.

(10) Patent No.: US 11,341,574 B2
(45) Date of Patent: May 24, 2022

(54) MULTI-DIMENSIONAL ORDER MESSAGE INTERFACE

(71) Applicant: Chicago Mercantile Exchange Inc., Chicago, IL (US)

(72) Inventors: Carrick John Pierce, New York, NY (US); David Nathaniel Hoff, Stamford, CT (US)

(73) Assignee: Chicago Mercantile Exchange Inc., Chicago, IL (US)

(*) Notice: Subject to any disclaimer, the term of this patent is extended or adjusted under 35 U.S.C. 154(b) by 259 days.

(21) Appl. No.: 16/235,549

(22) Filed: Dec. 28, 2018

(65) Prior Publication Data

US 2020/0211108 A1    Jul. 2, 2020

(51) Int. Cl.
G06Q 40/04    (2012.01)
G06F 16/26    (2019.01)

(52) U.S. Cl.
CPC ............ *G06Q 40/04* (2013.01); *G06F 16/26* (2019.01)

(58) Field of Classification Search
None
See application file for complete search history.

(56) References Cited

U.S. PATENT DOCUMENTS

| | | | |
|---|---|---|---|
| 6,098,051 A * | 8/2000 | Lupien | G06Q 40/12 705/30 |
| 7,039,610 B2 | 5/2006 | Morano et al. | |
| 7,831,491 B2 | 11/2010 | Newell et al. | |
| 7,853,499 B2 | 12/2010 | Czupek et al. | |
| 10,169,815 B2 * | 1/2019 | Buck | G06Q 40/04 |
| 10,510,114 B2 * | 12/2019 | Morano | G06Q 40/04 |
| 2002/0120555 A1 * | 8/2002 | Lerner | G06Q 40/025 705/37 |

(Continued)

FOREIGN PATENT DOCUMENTS

WO    WO-0190837 A2 *    11/2001 ............. G06Q 30/02

OTHER PUBLICATIONS

Hershberger, John; "Exchanges for Complex Commodities: Toward a General-Purpose System for On-Line Trading"; Aug. 20, 2003 (Year: 2003).*

(Continued)

*Primary Examiner* — Namrate Boveja
*Assistant Examiner* — William D Newlon
(74) *Attorney, Agent, or Firm* — Lempia Summerfield Katz LLC

(57) ABSTRACT

Systems and methods are provided for processing multi-dimensional orders. A data transaction request message is received at a data transaction system. The data transaction request message includes data representative of at least a first function for a first attribute of a commodity and a second function for a second attribute of the commodity. The data transaction system identifies a set of solutions described by the first function and the second function. The set of solutions including values for different variations of the object that the participant who submitted the data transaction request message is willing to offer or receive for the respective variation. The data transaction system attempts to match one or more of the values from the set of solutions to previously received but unsatisfied electronic data transaction request messages counter thereto stored in an order book data structure.

20 Claims, 12 Drawing Sheets

(56) References Cited

U.S. PATENT DOCUMENTS

| | | |
|---|---|---|
| 2005/0096999 A1 | 5/2005 | Newell et al. |
| 2005/0203826 A1 | 9/2005 | Farrell et al. |
| 2005/0256799 A1* | 11/2005 | Warsaw ................. G06Q 40/06 705/37 |
| 2006/0212274 A1* | 9/2006 | Anderson .............. G06Q 30/08 702/189 |
| 2007/0005481 A1* | 1/2007 | Kedia ................... G06Q 40/04 705/37 |
| 2014/0006243 A1 | 1/2014 | Boudreault et al. |
| 2015/0073962 A1 | 3/2015 | Bixby et al. |
| 2015/0161727 A1 | 6/2015 | Callaway et al. |
| 2017/0331774 A1 | 11/2017 | Peck-Walden et al. |
| 2018/0268481 A1 | 9/2018 | Bonig |
| 2018/0268482 A1 | 9/2018 | Bonig |

OTHER PUBLICATIONS

Extended European Search Report, from EP 19217982, dated Apr. 6, 2020, EP.

* cited by examiner

| FE Content % | | SiO2 (Silicon Dioxide) | | Al2O3 (Aluminum Oxide) | |
|---|---|---|---|---|---|
| < 60% | doesn't trade | <4% | doesn't trade | | |
| 60.10% | -28.5 | 4.00% | 0 | 2.50% | 0 |
| 60.20% | -27 | 4.10% | -1 | 2.60% | -1.5 |
| 60.30% | -25.5 | 4.20% | -2 | 2.70% | -3 |
| 60.40% | -24 | 4.30% | -3 | 2.80% | -4.5 |
| 60.50% | -22.5 | 4.40% | -4 | 2.90% | -6 |
| 60.60% | -21 | 4.50% | -5 | 3.00% | -7.5 |
| 60.70% | -19.5 | 4.60% | -7 | 3.10% | -10.5 |
| 60.80% | -18 | 4.70% | -9 | 3.20% | -13.5 |
| 60.90% | -16.5 | 4.80% | -11 | 3.30% | -16.5 |
| 61.00% | -15 | 4.90% | -13 | 3.40% | -19.5 |
| 61.10% | -13.5 | 5.00% | -15 | 3.50% | -22.5 |
| 61.20% | -12 | 5.10% | -17 | | |
| 61.30% | -10.5 | 5.20% | -19 | | |
| 61.40% | -9 | 5.30% | -21 | | |
| 61.50% | -7.5 | 5.40% | -23 | | |
| 61.60% | -6 | 5.50% | -25 | | |
| 61.70% | -4.5 | 5.60% | -27 | | |
| 61.80% | -3 | 5.70% | -29 | | |
| 61.90% | -1.5 | 5.80% | -31 | | |
| 62.00% | 0 | 5.90% | -33 | | |
| 62.10% | 1 | 6.00% | -35 | | |
| 62.20% | 2 | 6.10% | -37 | | |
| 62.30% | 3 | 6.20% | -39 | | |
| 62.40% | 4 | 6.30% | -41 | | |
| 62.50% | 5 | 6.40% | -43 | | |
| 62.60% | 6 | 6.50% | -45 | | |
| 62.70% | 7 | | | | |
| 62.80% | 8 | | | | |
| 62.90% | 9 | | | | |
| 63.00% | 10 | | | | |
| 63.10% | 11 | | | | |
| 63.20% | 12 | | | | |
| 63.30% | 13 | | | | |
| 63.40% | 14 | | | | |
| 63.50% | 15 | | | | |
| 63.60% | 16 | | | | |
| 63.70% | 17 | | | | |
| 63.80% | 18 | | | | |
| 63.90% | 19 | | | | |
| 64.00% | 20 | | | | |
| 64.10% | 21 | | | | |
| 64.20% | 22 | | | | |
| 64.30% | 23 | | | | |
| 64.40% | 24 | | | | |
| 64.50% | 25 | | | | |
| 64.60% | 26 | | | | |
| 64.70% | 27 | | | | |
| 64.80% | 28 | | | | |
| 64.90% | 29 | | | | |
| 65.00% | 30 | | | | |
| > 65% | 30 | | | | |

FIG. 7

MULTI-DIMENSIONAL ORDER MESSAGE INTERFACE

CROSS REFERENCE TO RELATED APPLICATIONS

The present patent application is related to co-pending patent application Ser. No. 16/235,526, filed on the same date, entitled "MULTI-DIMENSIONAL TRADABLE PRODUCT ORDER BOOK SYSTEM," the entire disclosure of which is incorporated by reference herein.

BACKGROUND

A data transaction processing system, such as an exchange computing system, processes data items or objects. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

In a typical data transaction processing system, each product may be transacted as a function of a price. A seller offers to sell a number of units of the product at a certain price and the buyer offers to buy a number of units of the product at a different price. If there is a match, a transaction occurs in which the seller sells the product to the buyer at an agree upon price. To maintain an orderly market, a typical data transaction processing system may require that each product be standardized so that the buyer and seller do not need to negotiate over anything but price. This mechanism is the underlying framework for all securities that are standardized and have standardized variables, including futures, equities, options, fixed income, etc. The key is one set of these products is fungible with any other set. There is no financial difference between one set of IBM shares and another set of the same class of shares. The same is true for futures products, as well as the thousands of options, bonds, ETFs and other exchange-traded securities traded all over the world.

However, assets such as physical commodities like iron ore, crude oil, or steel have specifications that are not uniform and range over a large value of attributes. The methods of transacting nonstandard products are much slower, more manual, less transparent and not easily systematized. One example is physical crude oil grades for which a variety of attributes such as gravity, sulfur content and location (logistics cost to market) determine a separate value for each grade. There is no generic "crude oil," for example. Even products like WTI (West Texas Intermediate) strike a benchmark off a popular grade and define a strict range of specific deviations from a standard for the range of defining attributes. Grades identified outside of these specifications are deemed 'not good delivery.' Once a potential transaction departs these standardized products, it enters into a complex set of pricing offsets, formulas and scales. The number of value-attribute combinations can run into the tens of thousands. Each buyer and seller may have their own needs and pricing mechanism.

Connecting buyers and sellers of any other of these peripheral grades or crude oil that falls outside of standard specs then falls into a semi-electronic 'basis market' (where products are traded at an offset to a benchmark), a limited distribution Electronic Communications Network (ECN) or a much more manual and bespoke, individually arranged bilateral transactions—negotiated over phone or Instant Messaging (IM.) The wide array of attributes and non-standardization had made these markets very challenging to perform efficiently. To negotiate a transaction requires negotiating on many of these individual attributes. Further, there is a very large industry and infrastructure of brokers and specialized trading firms who derive their business from exploiting the many pricing differences across the vast range of grades, product types, logistical challenges and general information opacity that there has not been a natural market incentive to create and promote electronic, central-limit trading in these markets.

BRIEF DESCRIPTION OF THE DRAWINGS

FIG. 7 depicts an example spreadsheet describing a price frontier.

DETAILED DESCRIPTION

Figure 1:
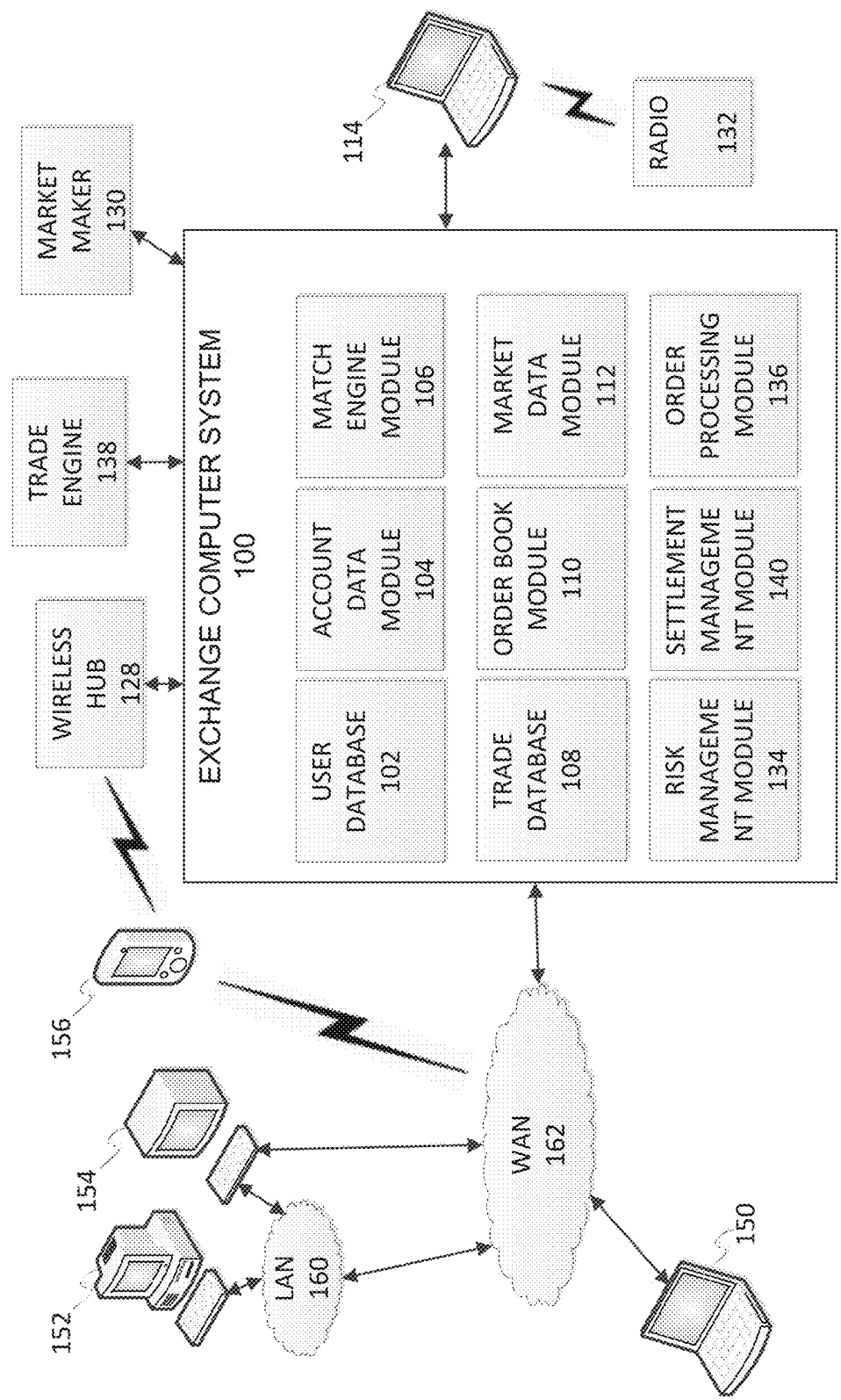
FIG. 1 depicts a computer network system, according to some embodiments.

The disclosed embodiments relate generally to a method for generating a multi-dimensional order message for transacting an object. The interface provides a mechanism to generate a data transaction request message that describes a participant's personalized evaluation of a non-standard commodity. The interface provides for transacting objects whose value is derived from multiple variables.

In an embodiment, the data transaction request message is received at a data transaction system. The data transaction request message includes data representative of at least a first function for a first attribute of a commodity and a second function for a second attribute of the commodity. The data transaction system identifies a set of solutions described by the first function and the second function. The set of solutions including values for different variations of the object that the participant who submitted the data transaction request message is willing to offer or receive for the respective variation. The data transaction system attempts to match one or more of the values from the set of solutions to previously received but unsatisfied electronic data transaction request messages counter thereto stored in an order book data structure.

Many physical commodities take various forms. Each lot or unit of certain physical commodities, for example, may be slightly different than another lot or unit. Commodities such as crude, grain, iron ore, and others may range from low grade (poor quality) to high grade (good quality) with numerous variations in-between. Many of these physical commodities maintain multiple different marketplaces for different grades. For example, there may be ten or more different grades of crude that are currently being traded extensively. To complicate the markets, each participant may value the grades and variations differently. One composition of crude may be more valuable to a first participant than a second composition while the reverse may be applicable to a second participant. One composition may be worthless to a one participant even when a second participant may pay a premium. The many different uses for these commodities may generate different needs and values for different compositions. Singular marketplaces (or even multiple markets for different grades) cannot provide the granular pricing and matching to provide an efficient marketplace for each of the participants. In the current marketplaces there is both waste in the pricing and matching mechanisms and underutilization for variations that lie outside the standard deviations.

One example of an asset whose value is derived from multiple variables is iron ore. Iron ore may be traded using the spot market, future, options, or other types of instruments. Iron ore is not a fungible commodity. Different percentages of iron content reflect both the natural variation in iron ore grades found in mine deposits and the degree of processing (if any) employed to upgrade the ore for a certain use. In general, higher purity ores help increase hot metal yields in the blast furnace, and also lower production cost by reducing the amount of coke required. The relative preference for different ore types depends on market conditions, and the differentials between the various iron ore indices are very dynamic. Consumption of iron ore products can also be constrained by the end-use application that the steel producer is designing its product for. Typically, higher-grade flat steel products require higher-quality raw material inputs with lower impurities to ensure that they are applicable to the end-product they are used in. Therefore, although some steel mills have become experienced in adapting their melt mix to accommodate for volatility in raw materials markets, others are more constrained by their customers as to how much they can mitigate severe market volatility. Lower-grade ores with higher fractions of impurities such as silica and alumina require increased consumption of coke, which can raise emissions of controlled gases and particulates.

One of the biggest driver of price changes is the profit margin that steelmakers are achieving—defined by the price at which they sell their steel minus the costs of their raw materials inputs. When margins are high and mills are profiting from each ton they produce, they may prefer to use high-purity ores to maximize their blast furnace yield. Conversely, when margins fall away, mills look to the cheaper low-grade ores to reduce costs and minimize their production rates. As a variable commodity, prices for iron ore are currently normalized back to index base specifications by using coefficients. The below table describes an example table of iron ore premium/discount allowances:

TABLE 1

| Target | Tolerance | Premium/Discount (CNY/MT) |
|---|---|---|
| Iron (Fe) | ≥60.0% | ≥60.0% & <62.0%: |
| Silicon dioxide (SiO$_2$) + Aluminum oxide (Al$_2$O$_3$) | ≤8.5% | −1.5 per 0.1% decrease >62.0% & ≤65.0%: +1.0 per 0.1% increase >65.0%: Pricing at 65.0% 0 |
| Silicon dioxide (SiO$_2$) | ≤6.5% | >4.0% & ≤4.5%: −1.0 per 0.1% increase; >4.5% & ≤6.5%: −2.0 per 0.1% increase (calculated accumulatively) |
| Aluminum oxide (Al$_2$O$_3$) | ≤3.5% | >2.5% & ≤3.0%: −1.5 per 0.1% increase; >3.0% & ≤3.5%: −3.0 per 0.1% increase (calculated accumulatively) |
| Phosphorus (P) | <0.15% | >0.07% & ≤0.10%: −1.0 per 0.01% increase >0.10% & ≤0.15%: −3.0 per 0.01% increase (calculated accumulatively) |
| Sulfur (S) | <0.20% | −1.0 per 0.01% increase |
| Grain size | Not less than 70% are finer than 0.075 mm | 0 |

The normalization of prices provides standardization and allows for iron ore to be traded across only a few marketplaces. However, normalization leads to inefficiencies in pricing and generates additional work and calculations. A buyer is not assured to get exactly what they want. A seller may not get the best price for their iron ore. After a transaction is completed, both parties must negotiate premiums and discounts as described above in Table 1. These premiums and discounts may not reflect the utility or price evaluations that each participant maintains. In addition, the premium and discount system may exclude certain grades of iron ore that may be desirable to certain participants.

Due to the different types of Iron ore, there are multiple different indices and markets for Iron ore. A 62% Fe index has been used as a benchmark for some time. However, the 62% Fe index could not serve to reflect the incredibly varied range of products. Negotiating premiums and discounts to this benchmark mid-grade index is like aiming at a moving target, with spot prices for different grade segments marching to the beat of their own drums. Different indices were therefore created for different grades and compositions. The different indices and markets splinter the market as a whole and generate subpar results. While more flexible and granular than a single index with premiums and discounts, the different indices still do not provide adequate coverage and support for both buyers and sellers. There is inexact pricing as there is still single price points for vast swaths of possible iron ore. Sellers may be stuck with products that could be useful to a buyer but for lack of an ability to advertise and sell the products. Premiums and discounts may also be required for settlement leading to additional work and time. Additionally, a firm or participant that wishes to bid on a variety of iron ore compositions (and price them per their specifications) is unable to or is prevented as setting up and receiving bids/offers for each of the combinations is impossible. Likewise, requiring bids and asks for each individual price point is unwieldy.

Embodiments provide systems and methods that allow participants to submit and transact different variations of an object using multi-dimensional orders. Multi-dimensional orders allow a participant to transmit a single order message that includes tens, hundreds, or thousands of price points that the participant would be willing to buy or sell a particular grade or composition of an object. The collection of price points may be referred to as a price frontier in that taken together, the price points create a boundary for which the participant is willing to offer or sell for. Price frontiers may be generated using a specifically configured interface and transmitted to a data transaction processor. The data transaction processor receives the formatted price frontier message, determines the price frontier contained there within and attempts to find a match with a previous received but unfilled order resting on a multi-dimensional order book structure. The use of price frontier reduces computational resources required to both transmit and process multi-dimensional orders. Price frontiers also provide a benefit to both buyers and sellers of commodities by providing granular pricing and matching.

Multi-dimensional orders can reduce over-advertisement of actual liquidity, and also reduce the amount of monitoring, updating, and messaging performed by client computers. Instead of submitting different messages/financial instruments where each is associated with a quantity, Multi-dimensional orders allows the trader to associate a function with a quantity.

Further, multi-dimensional orders remove the need to maintain linked orders, because the exchange computing system can treat all values arising from the same order as being linked. Thus, one multi-dimensional order may represent one or more sets or ranges of values. If the data transaction processor executes a match at any one of the values defined by the multi-dimensional order, the data transaction processor needs to only adjust (i.e., reduce) the quantity associated with the multi-dimensional order. Every other value defined by the multi-dimensional order thus becomes associated with the reduced quantity. There is no need, in function-based matching as disclosed herein, to check for linked orders or modify linked orders each time a match is executed.

When the market changes, some or all of these multi-dimensional order may need to be recalculated and updated, typically all at once or in as little time as possible, by, for example, sending in order modifications or cancellations to the exchange. The flood of information is taxing on the exchange hardware and also on customer's equipment as it may involve thousands to millions of message per second back and forth throughout a day.

One multi-dimensional order may be able to convey information that would normally require multiple discrete-value-based electronic data transaction request messages. For example, one multi-dimensional order can represent hundreds of different combinations of possible grades of a commodity. Thus, submitting function-based electronic data transaction request messages can greatly reduce the amount of information that is transmitted to the data transaction processing system.

Multi-dimensional order may be implemented to convey the same information as multiple, e.g., hundreds, of discrete-value-based electronic data transaction request messages, where each discrete-value-based electronic data transaction request message includes a request to perform a transaction at particular, specified parameters.

The multi-dimensional orders are much smaller in size and complexity than discrete-value-based electronic data transaction request messages. Specifically, the disclosed embodiments provide systems and methods for receiving, and performing transactions implementing, multi-dimensional orders. The disclosed embodiments enable client computers to submit requests including functions defining a desired set of price points for different grades of commodities, which greatly reduces the amount of messages submitted to the data transaction processing system. A data transaction processing system may typically receive millions of messages per day, so the multi-dimensional orders can significantly reduce overall network congestion. In one embodiment, the disclosed embodiments may implement a specific order type, a specific data transaction processor, e.g., hardware matching processor, for processing the order type, and a specific interface for interpreting market data and for generating multi-dimensional orders.

Once a user has submitted a multi-dimensional order, that may define a large set of values for various grades of a commodity, the user may efficiently and easily modify and manipulate the data set by submitting changes to the submitted function, as opposed to having to submit a separate modification for each of the price points. The disclosed embodiments accordingly also improve on modifying or manipulating a large set of data that may vary quickly with an underlying financial product or object, both by reducing the amount of messages/data which must be sent to accomplish the desired modification but also, thereby, reducing the latency of making such changes.

The data transaction processing system may also be configured to match or attempt to match multi-dimensional orders. Instead of checking each discrete value from one electronic data transaction request message against all discrete values from other electronic data transaction request messages for matches for each parameter of a trading variable (e.g., different grade variables), the data transaction processing system may compare price frontiers against the resting price frontiers to determine if the frontiers at least intersect, that in turn may indicate that two multi-dimensional orders match, and a transaction therebetween should be executed by the data transaction processing system.

A multi-dimensional order transaction processing system greatly reduces the number of recalculations needed to be performed. In the case of trading financial instruments that derive from, or otherwise depend on, other underlying financial instruments, e.g., options contracts that are derivatives of futures, each shift in the trading prices of an underlying may result in recalculations and changes to a massive number of other derivative financial instruments. Thus, the disclosed embodiments may be applicable for trading any derivative instrument. Some financial instruments, e.g., spread instruments, are defined as a difference in prices between other financial instruments. Such spread financial instruments, described below, are also affected each time the price of an underlying financial instrument changes. The disclosed multi-dimensional order system minimizes the number of recalculations that need to be performed by the client computer each time the price or value of an underlying financial instrument changes. The disclosed multi-dimensional order system also minimizes the number of recalculations that need to be performed by the exchange computing system when the price or value of an underlying financial instrument changes. The disclosed embodiments also reduce the overall messaging from client computers to the exchange computing system because the exchange computing system can perform the necessary recalculations upon a change in an underlying financial instrument.

The data transaction processing system, may, in one embodiment, operate in a stateful manner, i.e., depend upon historical/prior messages received, and/or rely upon previous results thereof or previous decisions made, by the transaction processing system. The data transaction processing system may also access data structures storing information about a current environment state to determine if orders or messages match.

The disclosed embodiments also improve upon the technical field of networking by compressing data by using a much smaller number of electronic data transaction request messages, which require less bandwidth for transmission and less storage, thereby improving network transmission speeds and reducing network congestion of messages transmitted to a data transaction processor. The disclosed embodiments also improve on the field of data processing by improving the efficiency and speed with which matches or transactions are performed on a large set of data. The disclosed embodiments also improve upon the technical field of data processing by enabling a data transaction processor to quickly identify acceptable transactions by comparing functions. The disclosed system is a specific implementation and practical application of a data transaction processor that matches multi-dimensional orders by identifying intersections/overlapping ranges between data points described by the multi-dimensional orders.

At least some of the problems solved by the disclosed encoding system are specifically rooted in technology, specifically in data communications where a large volume of messages is transmitted over a network to a data transaction processor, and the messages are frequently updated/modified by the submitter or because the messages derive from an underlying that is constantly fluctuating, and are solved by means of a technical solution, namely, enabling orders/requests to define functions that can encompass many values across multiple different parameters of different financial instruments. The disclosed embodiments solve a communications network-centric problem of sending large amounts of inter-related messages (e.g., for inter-related financial instruments, or for different parameters of a variable) all configured to be executed/processed immediately upon receipt. Accordingly, the resulting problem is a problem arising in computer systems due to the high volume of disparate but inter-related messages processed by an exchange computing system. The solutions disclosed herein are, in one embodiment, implemented as automatic responses and actions by an exchange computing system computer.

The disclosed embodiments may be directed to an exchange computing system that includes multiple hardware matching processors that match, or attempt to match, electronic data transaction request messages with other electronic data transaction request messages counter thereto. Incoming electronic data transaction request messages may be received from different client computers over a data communication network, and output electronic data transaction result messages may be transmitted to the client computers and may be indicative of results of the attempts to match incoming electronic data transaction request messages.

The disclosed embodiments may be implemented in association with a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

A "commodity futures contract" or "futures contract" gives a contract holder an obligation to make or take physical delivery of an associated commodity (e.g., corn, wheat, gold, etc.) under the terms of the contract. Both parties of a futures contract must fulfill the terms of contract on the settlement date. The seller delivers the underlying asset to the buyer. The buyer pays the seller for the underlying asset. Generally, physically delivery of commodities includes taking delivery of basic resources such as crude oil, etc., agricultural products such as sugar, coffee beans, soybeans, rice, wheat, corn, soybeans, etc. and metals such aluminum, gold, silver, etc. An actual physical commodity is delivered at the completion of a contract, as opposed to a futures contract on that physical commodity.

The spot market is where financial instruments, such as commodities and securities, are traded for immediate delivery. Delivery is the exchange of cash for the financial instrument. In spot markets, spot trades are made with spot prices. This varies from a futures market, since a futures contract is a based on delivery of the underlying asset at a future date. Organized exchanges and over-the-counter (OTC) markets may provide spot trading or futures trading. The following embodiments may be used to provide support for receiving, matching, and reporting multi-dimensional orders in any market, e.g. futures, options, or spot.

The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. Input electronic data transaction request messages may be received from different client computers over a data communication network, and output electronic data transaction result messages may be transmitted to the client computers and may be indicative of results of the attempts to match incoming electronic data transaction request messages. The specifically configured matching processors may additionally generate information indicative of a state of an environment (e.g., the state of the order book) based on the processing of the electronic data transaction request messages, and report this information to data recipient computing systems via outbound messages published via one or more data feeds that contain electronic data transaction result messages. While the disclosed embodiments may be described with respect to electronic data transaction request and result messages, it will be appreciated that the disclosed embodiments may be implemented with respect to other technologies later developed, such as photonic, e.g., light-based, messages.

For example, one exemplary environment where the disclosed embodiments may be desirable is in financial markets, and in particular, electronic financial exchanges, such as the Chicago Mercantile Exchange Inc. (CME).

I. EXCHANGE COMPUTING SYSTEM

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g. variable commodities), the specification may further define variables, step sizes, premiums, or discounts for use in processing multi-dimensional orders. As will be described, the exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

Typically, the terms and conditions of each futures contract are standardized as to the specification of the contract's underlying reference commodity, the composition of the commodity, quantity, delivery date, and means of contract settlement. In embodiments described herein, terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a nonconforming delivery. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

II. ELECTRONIC TRADING

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

In one embodiment, traders may buy and sell the disclosed tracking financial instrument instead of a futures contract that is associated with an underlying asset, where the futures contract may be settled by delivery of the underlying asset or by cash settlement.

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the Exchange or electronic trading system operated thereby, the following sequence describes how, at least in part, information may be propagated in such a system and how orders may be processed: (1) An opportunity is created at a matching engine of the Exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e. counter to the resting order; (5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

III. ELECTRONIC DATA TRANSACTION REQUEST/RESULT MESSAGES AND MARKET DATA FEEDS

As used herein, a financial message, or an electronic message, refers both to messages communicated by market participants to an electronic trading or market system and vice versa. The messages may be communicated using packets or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP", or Market By Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index. Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages may carry much more data than MBP messages because MBO messages reflect information about each order, whereas MBP messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An MBP book data object may include information about multiple values. The MBP book data object may be arranged and structured so that information about each value is aggregated together. Thus, for a given value V (e.g., a price), the MBP book data object may aggregate all the information by value, such as for example, the number of orders having a certain position at value V, the quantity of total orders resting at value V, etc. Thus, the value field may be the key, or may be a unique field, within an MBP book data object. In one embodiment, the value for each entry within the MBP book data object is different. In one embodiment, information in an MBP book data object is presented in a manner such that the value field is the most granular field of information.

An MBO book data object may include information about multiple orders. The MBO book data object may be arranged and structured so that information about each order is represented. Thus, for a given order O, the MBO book data object may provide all of the information for order O. Thus, the order field may be the key, or may be a unique field, within an MBO book data object. In one embodiment, the order ID for each entry within the MBO book data object is different. In one embodiment, information in an MBO book data object is presented in a manner such that the order field is the most granular field of information.

Thus, the MBO book data object may include data about unique orders, e.g., all unique resting orders for a product, and the MBP book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate an MBO book object and an MBP book object. It should be appreciated that each book object, or view for a product or market, may be derived from the MBO book object, which includes all the orders for a given financial product or market.

An inbound message may include an order that affects the MBO book object, the MBP book object, or both. An outbound message may include data from one or more of the structures within the exchange computing system, e.g., the MBO book object queues or the MBP book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

The disclosed embodiments may be applicable to the use of either an MBP market data feed and/or an MBO market data feed.

IV. MATCHING AND TRANSACTION PROCESSING

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module (described below) includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of a plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

V. CLEARING HOUSE

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house also regulates the delivery process.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Clearing houses, like the CME clearing house may specify the conditions of delivery for the contracts they cover. The exchange designates warehouse and delivery locations for many commodities. When delivery takes place, a warrant or bearer receipt that represents a certain quantity and quality of a commodity in a specific location changes hands from the seller to the buyer who then makes full payment. The buyer has the right to remove the commodity from the warehouse or has the option of leaving the commodity at the storage facility for a periodic fee. The buyer could also arrange with the warehouse to transport the commodity to another location of his or her choice, including his or her home, and pays any transportation fees. In addition to delivery specifications stipulated by the exchanges, the quality, grade, or nature of the underlying asset to be delivered are also regulated by the exchanges.

The delivery process may involve several deadlines that are handled by the Exchange clearinghouse. Different commodities may include different parameters and timing for delivery. The first deadline of an example delivery process is called position day. This is the day that the short position holder in the market indicates to the exchange clearinghouse that the holder intends to make delivery on his futures position and registers a shipping certificate in the clearing delivery system. Also, starting on the first position day, each FCM must report all of their open long positions to the clearinghouse. The clearinghouse ranks the long positions according to the amount of time they have been open and assigns the oldest long position to the short position holder that has given his intention to deliver.

At a second deadline, referred to as notice day, the short position holder and long position holder receive notification that they have been matched, and the long position holder receives an invoice from the clearinghouse. A third deadline is the actual delivery day. The long position holder makes payment to clearinghouse, and the clearinghouse simultaneously transfers the payment from the long to the short position holder, and transfers the shipping certificate from the short to the long position holder. Now the long position holder is the owner of the shipping certificate and the participant has several options. In an example of grain, the participant can hold the certificate indefinitely, but must pay the warehouse that issued the certificate storage charges, that are collected and distributed monthly by the clearing house. The participant can cancel the shipping certificate and order the issuing warehouse to load-out the physical commodity into a conveyance that he places at the issuing warehouse. The participant can transfer or sell the certificate to someone else. Or the participant can go back into the futures market and open a new position by selling futures, in which case he now becomes the short position holder. The participant may then initiate a new three-day delivery process, that would entail re-delivery of the warehouse certificate the participant now owns. During this time, the participant will continue to pay storage charges to the warehouse until he actually re-delivers the certificate.

As discussed herein, the disclosed embodiments may use the settlement prices, along with other market data for a target futures contract, to determine a tracking value. The value of a tracking financial instrument may be based on the tracking value, whereby trading the tracking financial instrument enables a trader to avoid many of the complications (e.g., computational, logistical, etc.) associated with trading a traditional futures contract.

VI. SPREAD INSTRUMENTS

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly}=\text{Leg1}-2*\text{Leg2}+\text{Leg3}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

VII. IMPLICATION

An exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order to create matches therein, are referred to as "implied" orders.

Upon receipt of an incoming order, the identification or derivation of suitable implied orders which would allow at least a partial trade of the incoming outright order to be executed is referred to as "implication" or "implied matching", the identified orders being referred to as an "implied match." Depending on the number of component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number of component financial instruments involved, and whether those component financial instruments further comprise component financial instruments of their own, there may be numerous implied opportunities, the submission of a counter order in response thereto, that would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the exchange will benefit from increased transaction volume. However, identifying implied opportunities may be computationally intensive. One response message may trigger the calculations of hundreds or thousands of calculations to determine implied opportunities, which are then published, e.g., as implied messages, via market data feeds. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counteroffer comes into the exchange, or is placed by a user of the exchange. The orders may be for two different contracts that only differ in delivery dates. It should be appreciated that such orders could be represented as a calendar spread order. Instead of waiting for two appropriate outright orders to be received that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the exchange computing system may be configured to detect that the two resting orders may be combined into an order in the spread instrument and accordingly creates an implied order.

In other words, the exchange may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic matching system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets", the entire disclosure of which is incorporated by reference herein and relied upon. Settlement price determination techniques may be implemented to cover calendar month spread instruments having different deferred month contracts.

Referring again to data transaction processing systems, a system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects. A base object may represent an outright order associated with a financial instrument, and a composite object may represent a spread order associated with a financial instrument.

VIII. COMPUTING ENVIRONMENT

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 120, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
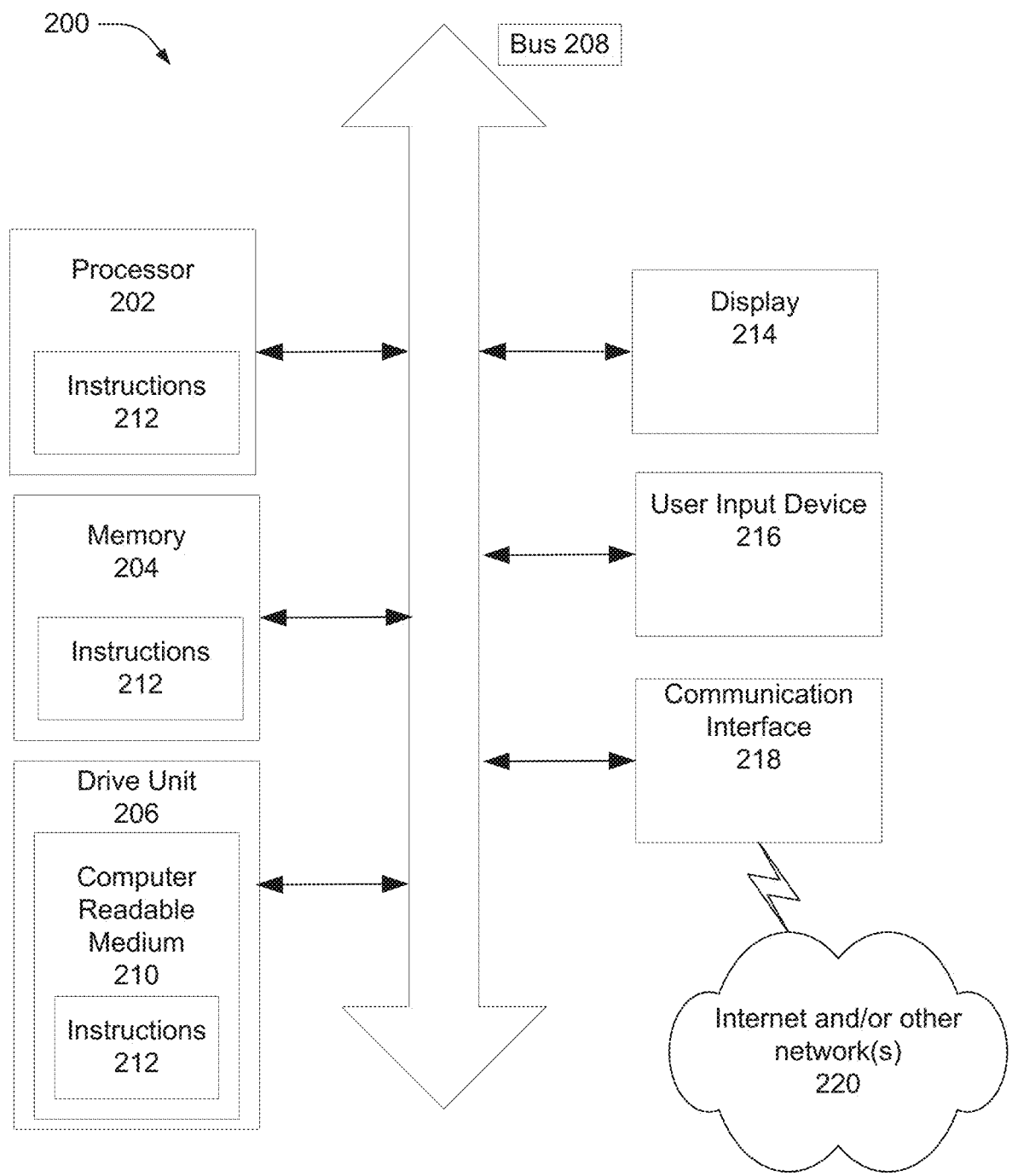
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 134 may be included to compute and determine a user's risk utilization in relation to the user's defined risk thresholds. The risk management module 134 may also be configured to determine risk assessments or exposure levels in connection with positions held by a market participant. The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 136 may be included to decompose delta-based, spread instrument, bulk and other types of composite orders for processing by the order book module 110 and/or the match engine module 106. The order processing module 136 may also be used to implement one or more procedures related to clearing an order. The order may be communicated from the message management module 116 to the order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module 136 may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 140. A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 150 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

IX. ORDER BOOK OBJECT DATA STRUCTURES

Figure 3:
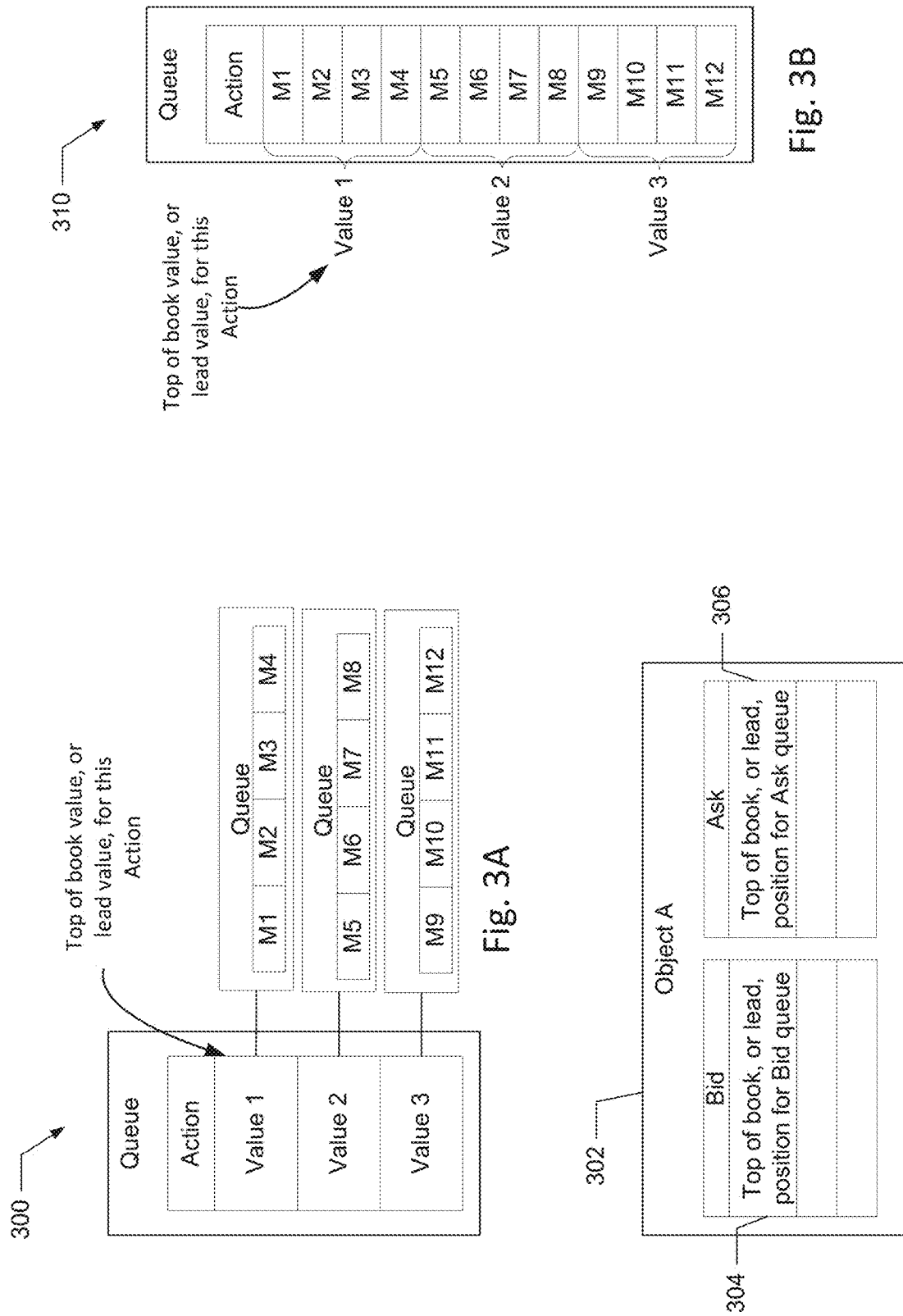
FIG. 3A depicts a storage data structure, according to some embodiments.
FIG. 3B depicts another storage data structure, according to some embodiments.
FIG. 3C depicts yet another data structure, according to some embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present application contemplates using queue data structures for storing messages in a memory, the implementation may involve additional pointers, i.e., memory address pointers, or linking to other data structures. Incoming messages may be stored at an identifiable memory address. The data transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

A lead acquisition value may be the best or lead value in an acquisition queue of an order book object, and a lead relinquish value may be the best or lead value in a relinquish queue of the order book object.

FIG. 3B illustrates an example alternative data structure 310 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a data transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

X. TRANSACTION PROCESSOR DATA STRUCTURES

Figure 4:
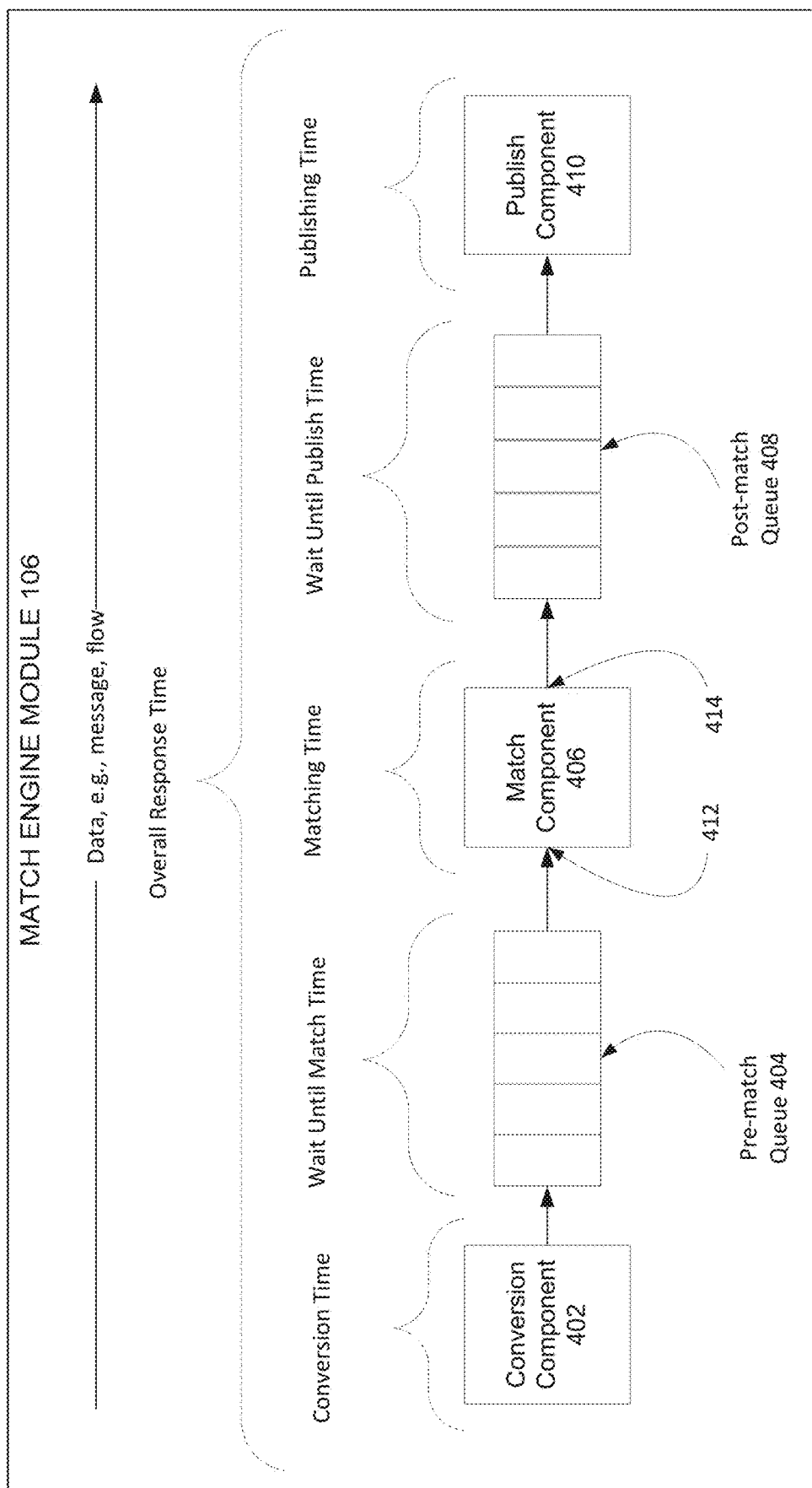
FIG. 4 depicts a match engine module, according to some embodiments.

FIG. 4 illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

It should be appreciated that match engine module 106 may not include all of the components described herein. For example, match engine module 106 may only include pre-match queue 404 and match component 406. In one embodiment, the latency detection system may detect how long a message waits in a pre-match queue 404 (e.g., latency), and compares the latency to the maximum allowable latency associated with the message.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out (FIFO) methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publicly viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends: being converted in the conversion component 402 may be referred to as a conversion time; waiting in the pre-match queue 404 may be referred to as a wait until match time; being processed or serviced in the match component 406 may be referred to as a matching time; waiting in the post-match queue 408 may be referred to as a wait until publish time; and being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

XI. MULTI-DIMENSIONAL TRANSACTION PROCESSING

Figure 5:
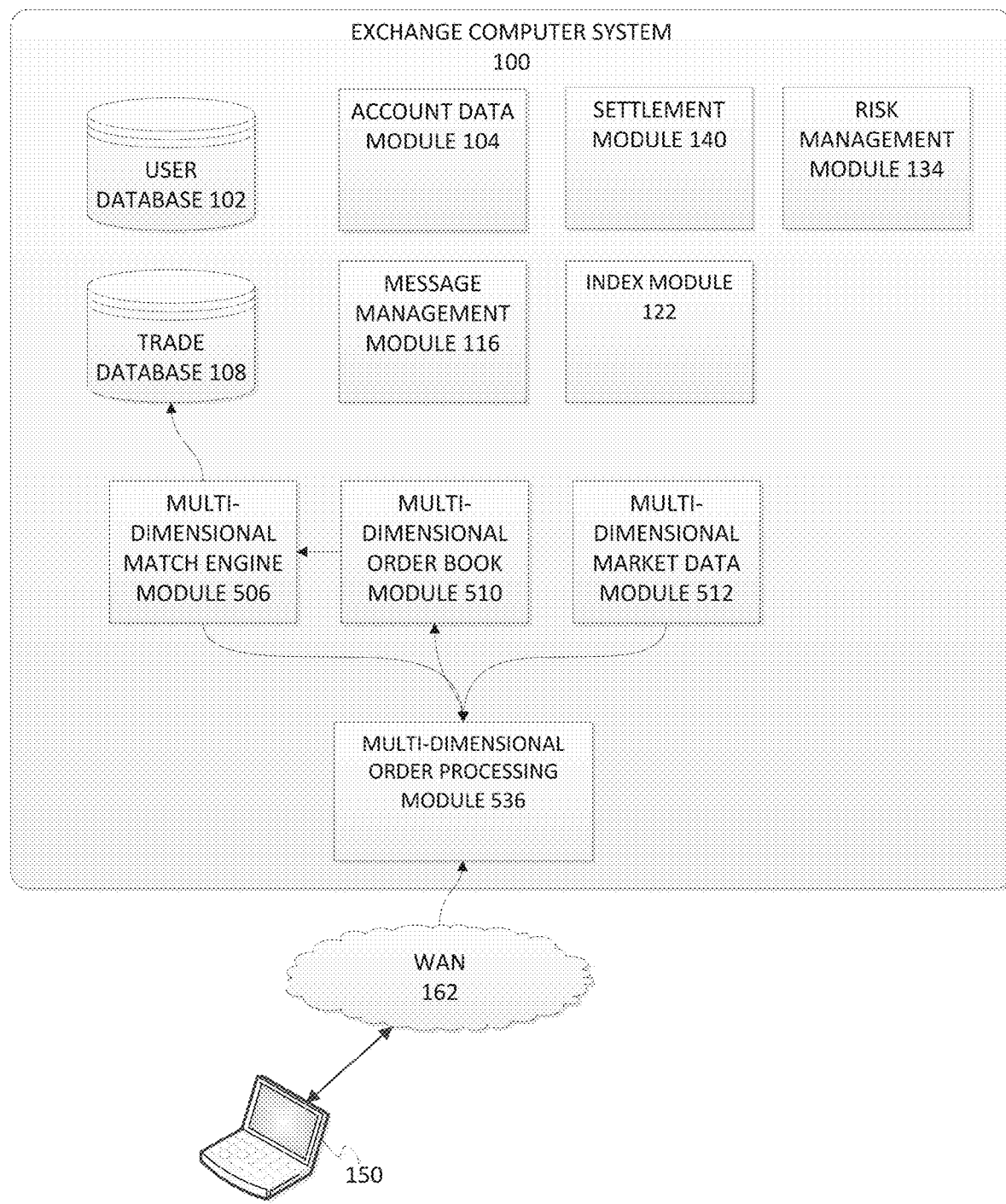
FIG. 5 depicts an example system architecture for optimizing a portfolio.

FIG. 5 depicts an example of an exchange computer system 100 configured to implement multi-dimensional transaction processing. The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades. The exchange computer system 100 accepts formatted electronic submissions of multi-dimensional orders for each traded product from market participants. The multi-dimensional orders include multiple different variables from which the value of the underlying commodity or product may be derived. These variables may, for example, define the composition of the commodity, delivery dates, delivery ports, contract terms, or other attributes that may provide or remove some value for a market participant. The multi-dimensional orders allow a market participant to specify price points for different combinations of the variables that concern the market participant. A set of solutions is generated by the multi-dimensional order processing module 536. The set of solutions is entered into the multi-dimensional order book, which sorts each set of solutions in several ways—by price level and ordinally by individual attribute level entry. The multi-dimensional match engine attempts to match one or more price points in the solutions set for previously received but unsatisfied orders stored in the multi-dimensional order book.

A risk management module 134 may be included to compute and determine a participant's risk utilization in relation to the participant's defined risk thresholds. The risk management module 134 may also be configured to determine risk assessments or exposure levels in connection with positions held by a market participant. The risk management module 134 may be configured to administer, manage or maintain one or more margining mechanisms implemented by the exchange computer system 100. Such administration, management or maintenance may include managing a number of database records reflective of margin accounts of the market participants.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system 100.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

The message management module 116 may be configured to determine if the incoming order is a properly formatted multi-dimensional order including data representing a price frontier. A price frontier is a dataset that includes a series of price points for different variations of a product. The price points may be calculated for the different variation using one or more functions provided by the participant. Unpacking the functions/price frontier provides a linked series of price points for the different variations. An example of a price frontier is provided below for a generic metallic ore product.

A sample price frontier may be received for a nonstandard market for a sample metallic ore. The metallic ore market as described includes multiple different variables from which the value of the metallic ore may be derived. In this example, the metallic ore includes three commodity variables (A, B, and C) that are used to describe the composition of the metallic ore. Other variables may also be used, for example, delivery dates, delivery ports, contract terms, or others. In an embodiment, each of these variables may set to a default standardized value. Each participant may value the level of each variable differently and as such may assign a different price to offsets from a standardized value. For example, a participants may value certain compositions differently than another participant while one participant may value the delivery port or contract terms while not being concerned as much with the compositions.

In this example, higher levels of A and lower levels of B and C are generally desirable to most participants in the market. The percentages of A, B, and C are denominated and rounded to 0.5%. For example, a delivery including metallic ore comprising 60.4% A would be rounded up and considered equivalent to 60.5% A metallic ore. A benchmark unit may be defined by the exchange computing system and may be agreed upon by each and all participants. The benchmark unit is used as an anchor from which offset described in the price frontiers are generated from. Any benchmark unit may be used. For example, in this example, the benchmark unit may be metallic ore that includes 60% A, 10% B, and 5% C. In an embodiment, a benchmark unit may not be defined, but rather the value imputed explicitly into the price frontiers. In an example price frontier, a user may submit a price frontier using a message format described below. The price frontier describes the price points that the participant is willing to pay for the metallic ore. A sample function could be Price Frontier=P+[(A−0.60)*X+(B−0.10)*Y+(C−0.10)*Z)]. P is a benchmark price (e.g. what would be considered the price under a single commodity marketplace). The variables A, B, C and X, Y, and Z describe attributes of the ore and the premiums that the participant is willing to pay for each respective variable. For example, in the function, the participant is willing to pay X premium for any percentage of A over 60%. Similarly, the participant is willing to pay Y premium for any percentage of B over 10%. X, Y, and Z may be set to positive or negative values so that the participant may select to pay more or less depending on the participants desires. By adjusting X, Y, and Z the participant can adjust the total price for the metallic ore that they are willing to purchase. In a standardized system, the participant may be locked into a specific grade of ore and specific premiums and discounts. Using a price frontier, the participant is able to bid exactly where they would like to be. Standardized premiums and discounts may still be used by the participants if they would like to use the standard premiums and discounts, but they do not have to. The flexibility allows a participant to exclude specific grades of metallic ore that they cannot handle or are not profitable while bidding more for specific grades that, for example, their smelter may be configured to handle.

The example price frontier describe above using a simple function. Each of the variables X, Y, and Z may nest more complexity. For example, X may represent multiple different variables or may be dependent on the value of Y. The complexity of the price frontier may be limited by the interface and the messaging systems. The price frontier may also be limited by the size of the market place. Each commodity variable A, B, C, etc. may be limited using step sizes. In the example described above, the step size of A may be limited to 0.5% steps. Each commodity variable A, B, C, etc. may also be limited by a maximum and minimum bound. A, for example, may range from 50% to 70%. Given these ranges and the 0.5% step size, the total possible A values may be 40 (50, 50.5, 51, . . . 70). If there are 30 possible B values and 20 possible C values the total number of possible combinations is 40×30×20 or 24,000. The price frontier described above P+[(A−0.60)*X+(B−0.10)*Y+(C−0.10)*Z)] as such provides 24,000 price points at which the participant would be willing to purchase the metallic ore. If the participant does not wish to participate at each of these levels, the participant may adjust the price frontier to exclude certain ranges or combinations. For example, the participant may set the price frontier to only include values of A from 60% to 64% and values of B from 8% to 10%.

A multi-dimensional order processing module 536 may be included to decompose multi-dimensional, delta-based, spread instrument, bulk and other types of composite orders for processing by the multi-dimensional order book module 510 and/or the multi-dimensional match engine module 506. The multi-dimensional order processing module 536 may also be used to implement one or more procedures related to clearing an order. The order may be communicated from the message management module 116 to the multi-dimensional order processing module 536. The multi-dimensional order processing module 536 may be configured to interpret the communicated order, and manage the order characteristics, other information, and associated actions as they are processed through a multi-dimensional order book module 510 and eventually transacted on an electronic market. For example, the order processing module 536 may store the order characteristics and other content and execute the associated actions.

The multi-dimensional order processing module 536 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the multi-dimensional order processing module 536 to, or otherwise be operative to receive an incoming multi-dimensional order and determine a set of solutions described by data included in the incoming multi-dimensional order, for example, by unpacking one or more functions for different variables to generate price points for each permissible combination.

In an embodiment, the multi-dimensional order processing module 536 may execute an associated action of placing the order into an order book for an electronic trading system managed by the multi-dimensional order book module 510. In an embodiment, placing an order into an order book and/or into an electronic trading system may be considered a primary action for an order. The multi-dimensional order processing module 518 may be configured in various arrangements, and may be configured as part of the multi-dimensional order book module 510, part of the message management module 116, or as an independent functioning module.

In an embodiment, the price frontier included in the multi-dimensional order may be mapped to a matrix or database in which each possible combination is assigned a price. In the example above, the total number of combinations is twenty four thousand. A price may be calculated for each combination using an incoming or existing price frontier. The calculated prices may be stored in a data structure or dataset, for example, a multi-dimensional order book data structure. Each of the price points for a price frontier may be linked so that if one order matches at least a partial quantity then the quantity for whole of the price frontier is decreased.

A multi-dimensional match engine module 506 is included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price. The multi-dimensional match engine module 506 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the multi-dimensional match engine module 506 to, or otherwise be operative to match at least partially some quantity at one or more price points unpacked from an incoming multi-dimensional order message with a previously received but unsatisfied data transaction request message. The previously received but unsatisfied data transaction request message may be multi-dimensional order message or may be a single dimension order message (price/quantity for a standardized commodity).

The matching engine matches incoming orders with resting orders. If the incoming order is a price frontier to buy, the matching engine attempts to match any of the price points in the price frontier with an existing price point to sell. If the incoming order is an order to sell, the matching engine attempts to match any of the price points in the incoming price frontier with an existing price point to buy stored in the order book data structure. While the examples described herein relate to price frontiers that contain more than one price point for different variations of the commodity or instrument, the data transaction system is also configured to handle typical order formats that include a price and a quantity. Typical order formats are for a standardized commodity, e.g. one with a set range of acceptable variations. The matching engine may receive such a standard order format and attempt to match the incoming order with the combination as it exists as a single point on the order book data structure. In an embodiment, the matching engine may use vector matching to match incoming orders with resting orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

In an example, an incoming multi-dimensional order for a set quantity may match with multiple resting orders. The priority for filling the incoming multi-dimensional order may be defined by the exchange computer system 100 in the specification of the particular financial product. In on example, the specification may state that incoming multi-dimensional orders are always match the best buy price first or match the best sell price first. Alternatively, in an embodiment, the participant that submits the multi-dimensional order may provide a preference, e.g. assign priority to certain combinations or ranges of combinations.

In another example, an incoming sell order may be matched with the best bid available for the sell order, e.g. the highest price. If there are a range of sell orders in a multi-dimensional order, the order may be matched with the best available buy order for any of the combinations in the sell order. Similar to incoming multi-dimensional buy orders, the matching priority of incoming multi-dimensional sell orders may be defined by the exchange computer system 100 in the specification of the particular financial product.

In an embodiment, the multi-dimensional match engine module 506 may include multiple match engines. The multiple match engines or match engine processors may attempt to find matches for the incoming order in parallel across the multi-dimensional order book data structure.

A multi-dimensional order book module 510 may be included to compute or otherwise determine current bid and offer prices, e.g., in a continuous auction market, or also operate as an order accumulation buffer for a batch auction market. The multi-dimensional order book module 510 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the multi-dimensional order book module 510 to, or otherwise be operative to store data associated with the set of solutions if at least one solution of the set of solution of the first electronic data request message does not match fully with a previously received but unsatisfied electronic data transaction request message counter thereto stored in the multi-dimensional order book module 510.

The order book stores resting orders. The order book structure may store orders in different ways. One data structure for the order stores the orders using a function such as was used to define the price frontier in the electronic submission. In this embodiment, each price frontier may be unpacked to match against incoming orders. The order book data structure may also store an approximation along with the price frontier. The approximation may identify a lower bound (or higher bound) for the price frontier for the price points. When matching, the approximation may be checked first to determine if the price frontier should be unpacked and processed by the matching engine.

A second data structure may unpack the electronic submission and store each of the points of data in a data structure, for example, that may be sorted or organized by price level and by individual attribute level entry. The second data structure may only store a limited number of price points from resting price frontiers for each combination. For example, if price frontiers A, B, and C representing buy orders are resting on the order book, the second data structure may unpack each of the three and identify a best bid (e.g. highest bid price) for each combination. In this way, even if there are tens or hundreds or thousands of price frontiers that are resting, the order book data structure may only store a small number of price points. Each price point stored in the order book data structure may point back to the respective price frontier from which it was unpacked.

A third data structure may store the electronic submission in a data map. Similar to storing the electronic submission using each price point, the data structure may be represented as a two dimension chart where each possible data point is mapped against the price level. Each price frontier may comprise a layer in the data structure. When laid on top of one another, the resulting map may represent the bid or offer frontier for the market.

A multi-dimensional market data module 512 may be included to collect market data and prepare the data for transmission to users. For example, the market data module 112 may prepare the market data feeds described herein.

Figure 6:
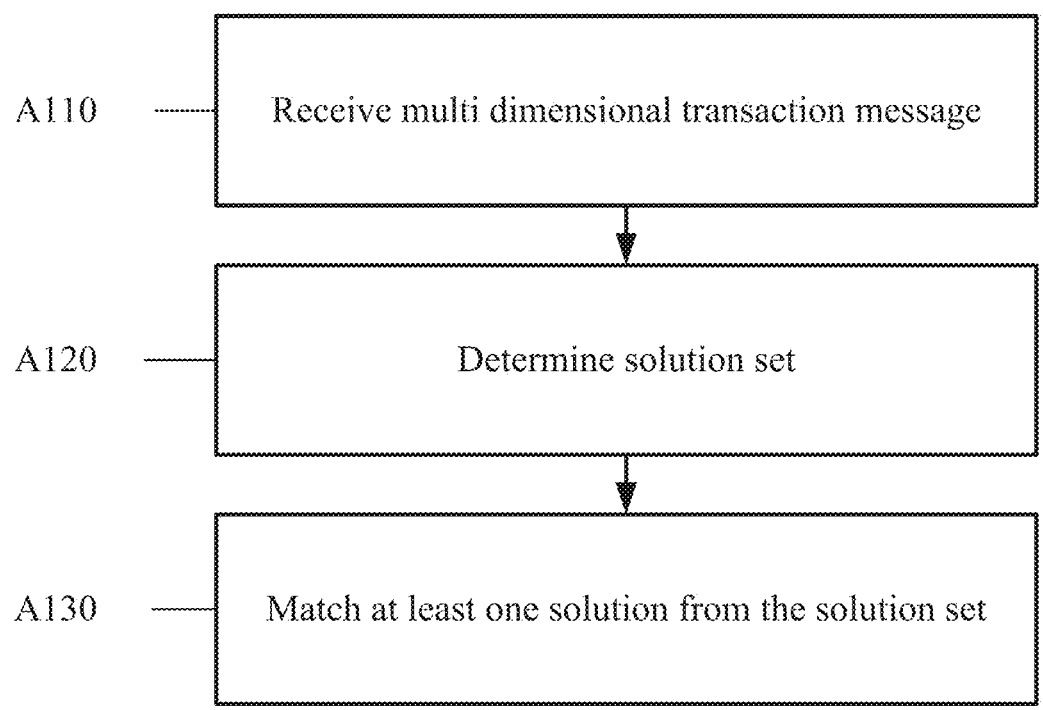
FIG. 6 depicts an example workflow for optimizing a portfolio.

FIG. 6 depicts an example method for processing electronic data transaction request messages in a data transaction processing system in which data objects are transacted by data transaction processors that match electronic data transaction request messages for data objects received from different client computers over a data communications network.

At act A110, a first electronic data transaction request message to perform a transaction is received. The first electronic data transaction request message includes data representative of at least a first function for a first attribute of an object and a second function for a second attribute of the object. The first electronic data transaction request message includes data that describes a multi-dimensional order also referred to as a price frontier. A price frontier may be defined by at least the first function and the section function. The price frontier may be defined by multiple functions that describe the pricing scheme a participant desired to put forth. Functions may be simple equations, step function, or a set of price points among others.

FIG. 7 depicts an example list of premiums and discounts a participant is willing to offer for specific grades of iron ore. Each participant may value the ranges and compositions differently. The premiums and discounts of FIG. 7 may be translated into one or more functions. For example, a first function may describe the premiums for FE content %, a second function may describe the premiums for Silicon Dioxide content, and a t third function may describe the premiums for Aluminum Oxide. The functions may define offsets from a static or dynamic benchmark value. When combined together the three functions describe the price points at which the participant is willing to pay for compositions of iron ore. As depicted, the participant is willing to pay a premium for FE content over 62%, but wants a discount on iron ore with a silicon dioxide composition of more than 4%. The participant may define step values, minimum, and maximums for the variables. The step values, minimums, maximums, and functions templates may be defined by a specification generated by the exchange computing system 100. The specification may be embedded in the interface for the participant so that the resulting output transaction request message conforms to a standard that is agreed upon and straightforward to process. The interface is described below at section XII. The participant, using the interface, transmits the multi-dimensional transaction request message to the data transaction system. The participant may be able to adjust the functions used to the create the multi-dimensional transaction request message using the interface. Any updates to a previously transmitted multi-dimensional transaction request message may thus be made and sent to the data transaction system.

At act A120, the data transaction processor determines a set of solutions based on the first function and the second function. The data transaction processor may unpack the multi-dimensional order by calculating price points for each possible combination covered by the multi-dimensional order. The set of possible combinations may be limited by a defined step size, maximum value, and minimum value for each of the variables. The step size, maximum value and minimum values may be determined by a specification for the commodity that is defined and managed by the exchange computing system 100. The step size, maximum value and minimum values may be adjusted by the exchange computing system 100 to meet demand and also to manage computing resources and time required to determine the set of solutions. The set of solutions may also be limited by the resting orders on the order book for the commodity. For the matching process, the data transaction processor may only identify solutions for possible values or value range of resting orders on the order book.

The multi-dimensional order may include functions that reference a benchmark variable. For example, a function may include a reference to a benchmark index price published by a reputable source. In such a scenario, the data transaction processor may retrieve a value for the variable to calculate the set of solutions. In an embodiment, the set of solutions may be constantly recalculated if the set of solutions is pegged to a changing benchmark value. The data transaction processor may limit the number of recalculations in order to manage computer resources and the complexity of the set of solutions. For example, the data transaction processor may only recalculate the set of solutions every minute, five minutes, every hour, or every day among other time periods.

In an embodiment, the data transaction processor does not determine the set of solutions unless the multi-dimensional order is expected to cross an existing order on the order book. The data transaction processor may compare the functions in the multi-dimensional order with functions representing the current resting orders. The data transaction processor may after each order is received and process (either matched or rested), generate a fitted curve that describes the best offers and bids resting on the order book. The fitted curve may not exactly represent the best offers and bids (by fitting, certain offers and bids may be diminished or increased). However, the fitted curve may be used as a gatekeeper to determine if an incoming order is going to possibly match. If, for example, the incoming order is not within a range of the fitted curve, the incoming order may be deprioritized. The incoming order may eventually be processed, for example, to rest on the order book, but not immediately.

Figures 8A, 8B:
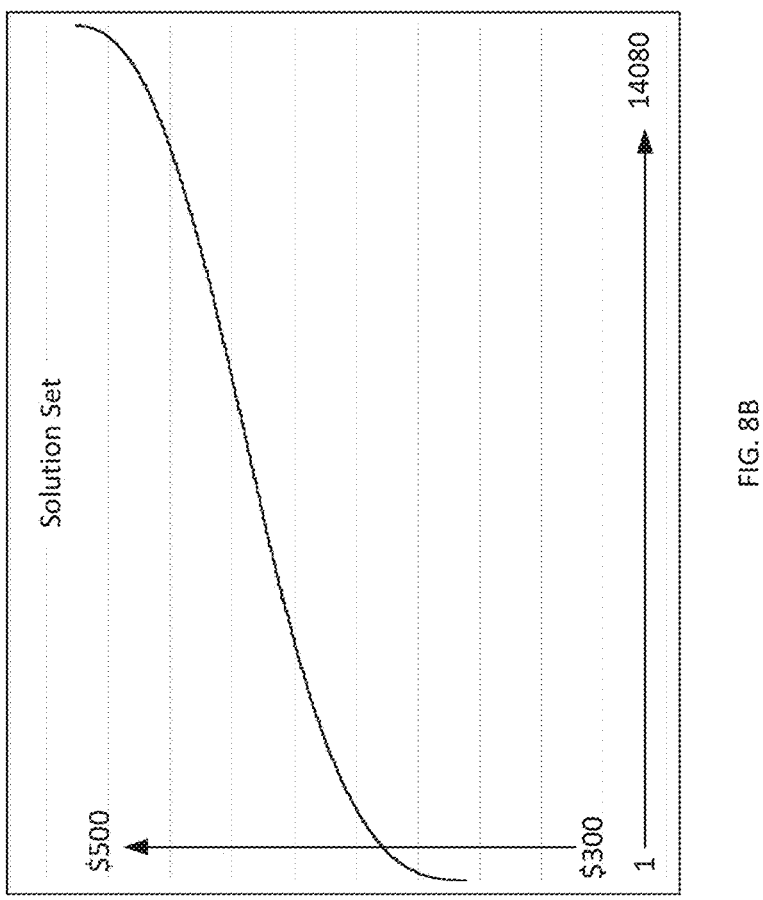
FIG. 8A depicts an example spreadsheet describing a partial set of solutions using the price frontier of FIG. 7.
FIG. 8B depicts an example graph of the set of solutions of the price frontier of FIG. 7.

FIGS. 8A and 8B depicts an example partial set of solutions and set of solutions curve respectively. The example table of FIG. 8A only contains a subset of the possible combinations. As depicted, the table lists the FE, the silicon dioxide, and the aluminum oxide compositions and the respective offsets defined by the table of FIG. 7. The total value is calculated as a combination of the offsets and a benchmark price. The benchmark price may be set by the participant or may float according to an index or function. In FIG. 8B, each of the combinations is graphed by price. The entire set of solutions of around 14,000 combinations forms a price curve that may be compared to other incoming transaction request. Alternatively, or additionally, each price point in the set of solutions may be compared to resting order (or incoming orders) as described below.

At act A130, matching, by a matching processor, at least partially, at least one solution of the first set of solutions of the first electronic data transaction request with at least one other previously received but unsatisfied electronic data transaction request message counter thereto stored in an order book data structure. The order book data structure stores a plurality of set of solutions determined from a plurality of previously received but unmatched electronic data transaction request messages. The matching processor is configured to identify matching between incoming orders and resting orders on the order book. An incoming order may be an "aggressor" order, i.e., a market order to sell a given quantity of one or more different compositions of the commodity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

The matching processor may consider each solution in the set of solution as a linked order. Each solution may be checked against data representing the respective combination of variables to see if the respective solution crosses a previously received order. If multiple solutions match against resting orders, the priority may be given to the best resting order, e.g. the highest bid if the incoming order is a sell order or lowest ask if the incoming order is a buy order. Alternatively, the matching solution may be selected by a priority defined by the specification for the product.

If the exchange computer system identifies that an incoming market order may be filled by a combination of multiple resting orders, e.g., a resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products. These algorithms for distribution include allocation, FIFO, FIFO with LMM, FIFO with Top Order and LMM, Pro-rata, and Threshold Pro-rata. These algorithms are applicable for multiple resting solutions that match multiple incoming multiple solutions as well as multiple resting orders that match one solution.

Figure 9:
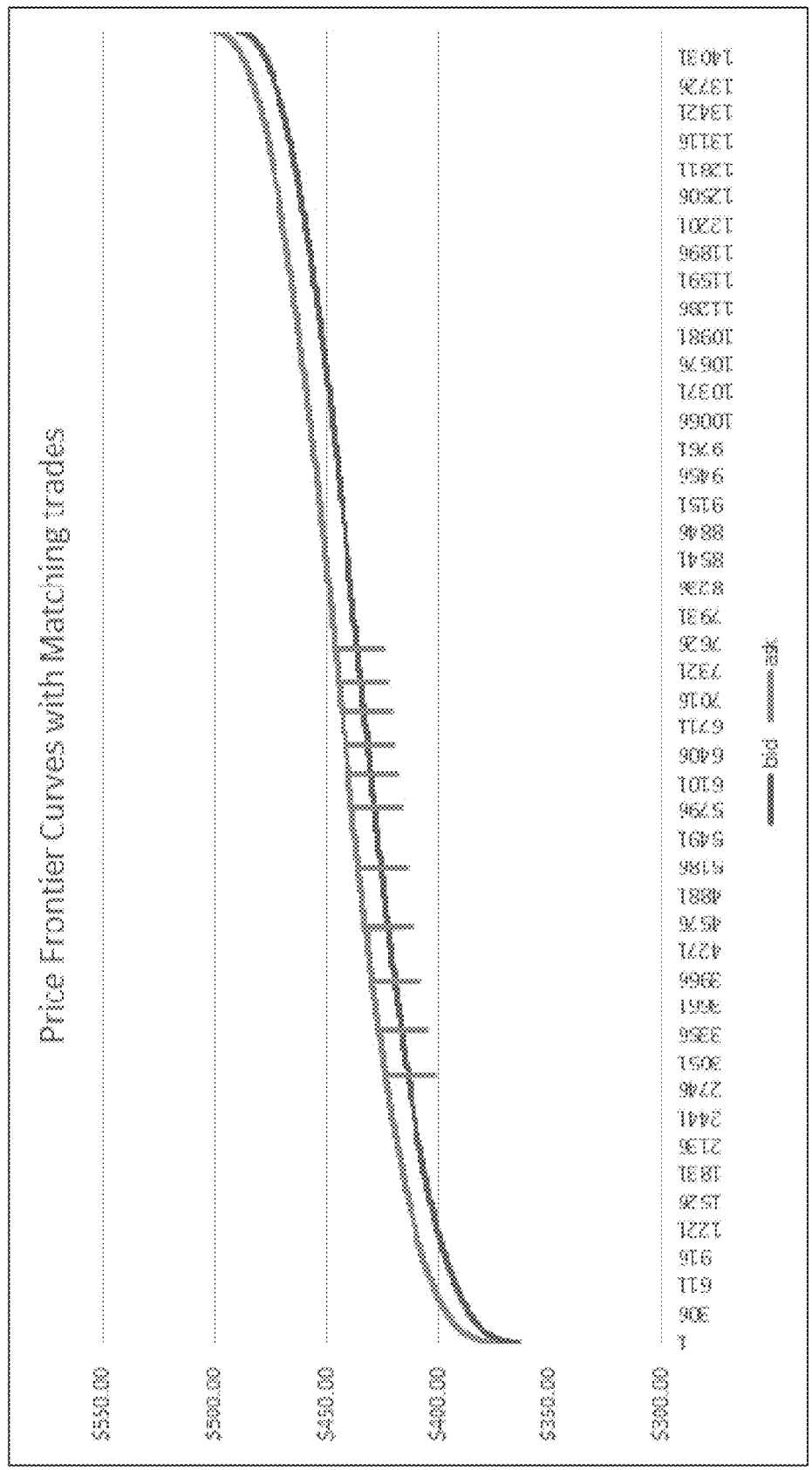
FIG. 9 depicts an example of matching trades between two price frontier curves.

FIG. 9 depicts an example of matching transactions. FIG. 9 depicts two price frontier curves (two set of solutions) including the price frontier of FIG. 8. The set of solutions of each price frontier may be unpacked or determined at act A120. Each point in an incoming set of solutions may be compared against resting solutions. If a match is found, the incoming order is matched and a report is generated. In FIG. 9, there are eleven matches between the two price frontier curves. For most price points in the set of solutions the two curves do not cross. But, however, at the points where the two interest there is an agreement for a price for a specific composition of iron ore. The matching algorithm may determine which of the price points and compositions are filled. If the quantity is sufficient to fill either of the price frontiers, the respectively completed price frontier will be removed from the order book data structure.

After matching, the order book data structure and the matching processor generate a report as described above. The completed trade may be published for all the participants to access. If there is not match or a partial match, the order book data structure and matching processor may also generate a report detailing the updated state of the order book data structure as described above.

XII. MULTI-DIMENSIONAL TRANSACTION INTERFACE

The transaction of a multi-dimensional order requires a protocol by which trade messages containing the possibly tens of thousands of price points are represented in a message packet. In addition, multi-dimensional orders require an interface by which the marketplace may be viewed and by which a multi-dimensional order may be generated.

Front end interfaces may be installed at trader and broker (participants) desktops. The interfaces are the mechanism by which users enter specialized price frontiers that may be understood by the exchange computing system 100. The interfaces use an expanded messaging protocol as the current message protocols cannot accept the multi-dimensional order types. The interface maintains an updated version of the specification for objects that have variable compositions. The interface thus automatically transforms participant input into a formatted message that allows a single message to convey multiple different possible orders.

As described above, one commodity that may use multi-dimensional orders to improve the marketplace and reduce computational resources is iron ore. Iron ore, like other physical commodities, is not a fungible commodity. Different variations of iron ore exist that hold different values for different producers and consumers. As described above, FIG. 7 depicts an example list of premiums and discounts a participant is willing to offer for specific grades of iron ore. Each participant may value the ranges and compositions differently. The premiums and discounts of FIG. 7 may be translated into one or more functions. For example, a first function may describe the premiums for FE content %, a second function may describe the premiums for Silicon Dioxide content, and a third function may describe the premiums for Aluminum Oxide. The functions may define offsets from a static or dynamic benchmark value. When combined together the three functions describe the price points at which the participant is willing to pay for compositions of iron ore. As depicted, the participant is willing to pay a premium for FE content over 62%, but wants a discount on iron ore with a silicon dioxide composition of more than 4%. The participant may define step values, minimum, and maximums for the variables. The step values, minimums, maximums, and functions templates may be defined by a specification generated by the exchange computing system 100. The specification may be embedded in an interface for the participant so that the resulting output transaction request message conforms to a standard that is agreed upon by all participants and the exchange. The participant uses the interface to generate and transmit the multi-dimensional transaction request message to the data transaction system.

Figure 10:
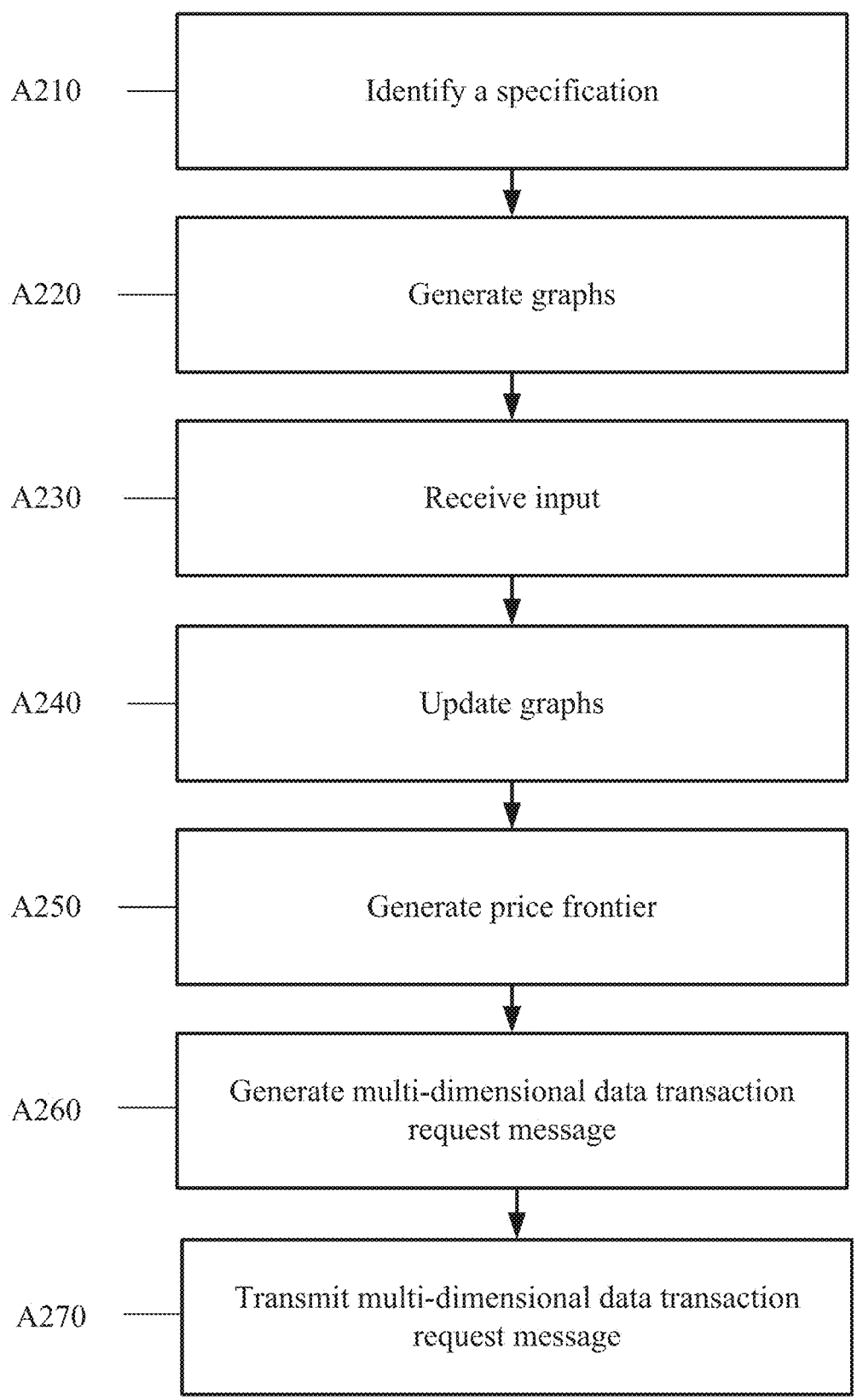
FIG. 10 depicts an example workflow for generating a price frontier.

FIG. 10 depicts an example workflow for facilitating trading of an object being transacted in a data transaction system using multi-dimensional orders. Embodiments include a display/trade entry device for defining a multi-dimensional order type and a matching engine for processing a multi-dimensional order type (See Section XI. above). A display device includes a user interface for visualizing non-standardized product markets and price frontiers and for defining personalized price frontiers that can be submitted to the multi-dimensional matching engine.

At act A210, a specification for a data object is identified. The specification for the data object includes at least a first variable and a second variable. A variable may represent any parameter that may be assigned a value by a participant. Examples of variables may include the composition of a commodity, the delivery date, the delivery location, the quantity, among others. Variables may represent any negotiable aspect of a commodity, for example from who is responsible for demurrage to the packaging to the parties involved etc. The specification for the data object may identify each of the variables and their ranges. The specification may be defined by the exchange computing system 100. A specification for a data object may define the possible combinations of variables that may be used to price the data object. In an of a specification for iron ore, the specification may include possible ranges and step sized of material compositions. For example, the compositions and ranges may be set for Iron (Fe)$\geq$60.0%; Silicon dioxide (SiO2)+Aluminum oxide (Al2O3)$\leq$8.5%; Silicon dioxide (SiO2) $\leq$6.5%; Aluminum oxide (Al2O3)$\leq$3.5%; Phosphorus (P)$\leq$0.15%; Sulfur (S)$\leq$0.20% and the Grain size—not less than 70% are finer than 0.075 mm. In an embodiment, each variable may also be assigned a step size. Standard premiums and discounts may also be defined. The specification provides a template for generating a price frontier and a multi-dimensional order. The specification may define a messaging format and other parameters for transmitting the multi-dimensional order.

At act A220, one or more graphs are generated for the first variable and a second variable. The graphs may represent a price curve for each variable described in the specification. Price curves may be defined by the participant to reflect the premiums and discounts that the participant selects. The participant may set the price curve to be higher for grades or variables that the participant desires. The participant may zero out certain points or ranges that the participant does not want. The price curve for each variable may be linear, quadratic, or involve additional functions. The price curve may be calculated using multiple constants and variables in addition to the specific variable described in the specification. An example of a constant is a benchmark value that may be defined by reputable sources or exchanges. The benchmark value may be the official spot price from which any offsets are calculated.

Figure 11:
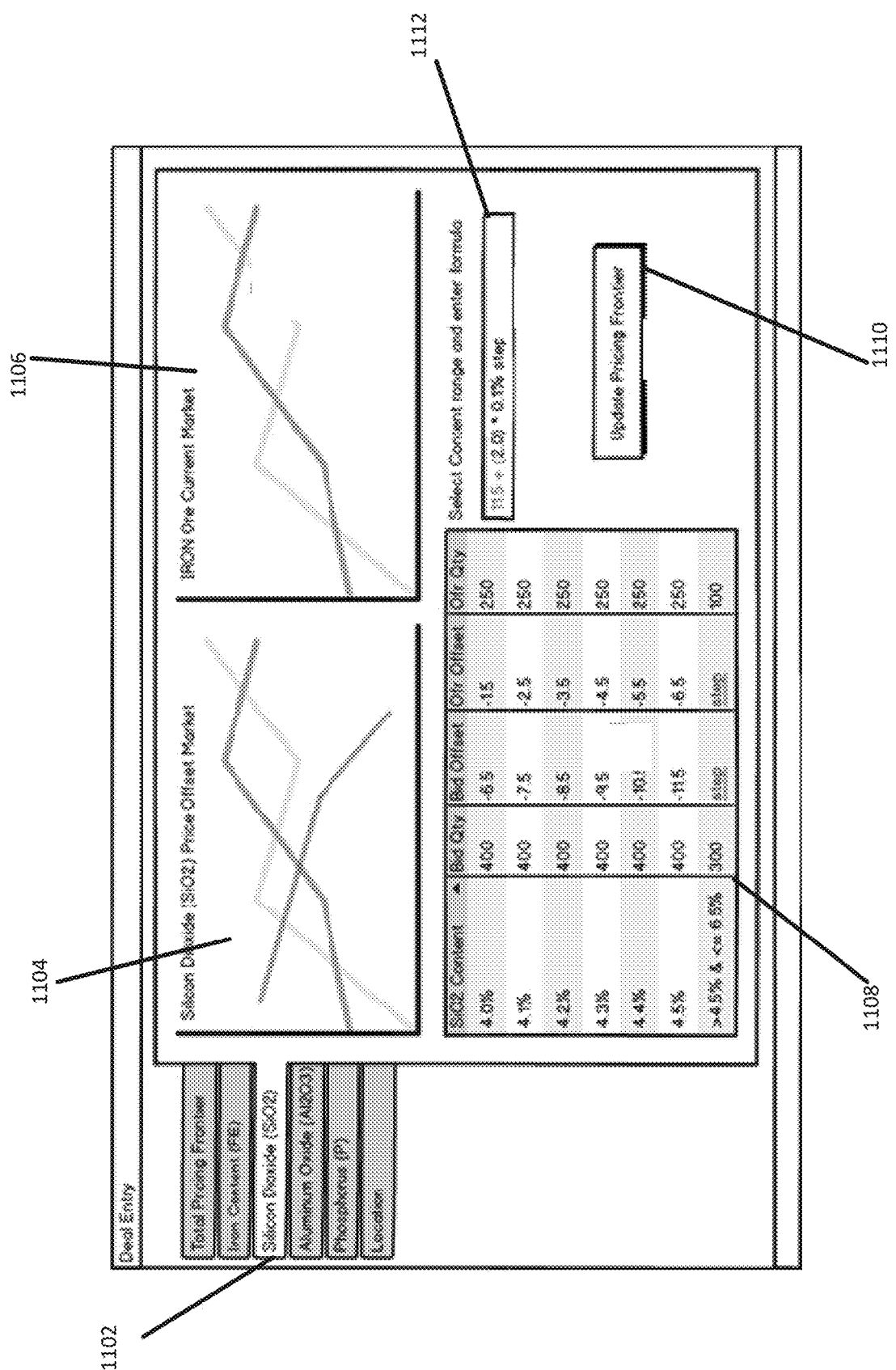
FIG. 11 depicts an example graphical user interface for generating a price frontier.

FIG. 11 depicts an example interface for facilitating trading of an object being transacted in a data transaction system using multi-dimensional orders. FIG. 11 includes a plurality of screen or each of a plurality of attributes associated with a data object (here Iron ore). Each screen displays a price-attribute pair graph 1104. As depicted, the current selection of the Silicon Dioxide tab 1102 brings up a price-attribute pair graph 1104 for Silicon Dioxide. FIG. 11 further includes a graph of the overall iron ore market. The market price frontiers 1106 are displayed (ordered by price level.) The market price frontiers 1106 are provided by a market data feed from the data transaction processing system. The data transaction processing system publishes market data representing the state of the order book for the commodity. In an embodiment, the data transaction processing system may generate a fitted curve that represents the inside or best bid and ask prices for each of the combinations resting on the order book. The fitted curve or the actual data, such as level 1 representing the inside prices, may be received and displayed by the interface. The fitted curve may be easier to visually display when dealing with thousands of possible combinations. The actual price points may be identified by the interface to indicate to the participant if their price frontier may match an existing price point but may not be depicted. Additional information, such as level 2 information may include all the available prices that market makers and electronic communication networks (ECN) post. A participant may configure the interface to display the level 1 or level 2 data or other information that the participant desires to see when generating price frontiers.

At act A230, a first value is received for a first variable and a second value if received for a second variable. Values for the variable may be input by a participant or automatically, for example, by an algorithm. A user may use input controls such as sliders and zoom in/out to examine specific regions of the price frontier. A table may be used or displayed with the price-attribute pair graphs to input the values. The table, including scroll bars, presents and displays all possible attribute level combinations, their current bids and offers, available sizes and the user's bid or offer price frontiers (or both) along with their quantity vectors. After the interface receives an input, at act A240, the one or more graphs are updated based on the first value and the second value.

As depicted, FIG. 11 includes a price-variable table 1108 that lists specific bids, offsets, quantities, and other transaction related data. The data from price-variable table 1108 may be used to generate the visual price-attribute pair graph 1104. A participant may input a function in the formula field 1112 to generate a price frontier. The result of the function may be shown in the price-variable table 1108 and in the price-attribute pair graph 1104. The formula field 1112, the price-variable table 1108, and the price-attribute pair graph 1104 may all be linked so that a change to data of one may alter the other two. For example, a user can use a stylus pen on a capacitive screen to draw or point out a curve on the price-attribute pair graph 1104. The input data may be translated into the formula field 1112 and the price-variable table 1108. The formula field 1112 may be limited in its complexity by a specification defined by the data transaction processing system. For example, the specification may limit the variables, multipliers, coefficients, etc. of the function so that the price frontier may be packaged and transmitted to the data transaction system in a formatted standardized message. The formula or function in the formula field 1112 may be indicative of a range of values, e.g. which may satisfy a parameter of the order. The range may be continuous or discontinuous, bounded or unbounded. When the participant has input their desired price frontier, the user selects the update price frontier button 1110 which locks in the function (but does not transmit). The participant may then make any changes to the other variables. Once all the functions and ranges for each of the variables has been input, the interface may generate a price frontier for the commodity that aggregates all the formulas and functions.

At act A250, a price frontier graph for the data object is generated. The price frontier graph may be an aggregation of each of the one or more individual graphs for the variables. If one of the individual graphs or values for the variables are adjusted, the price frontier graph may be adjusted as well to reflect the change.

Figure 12:
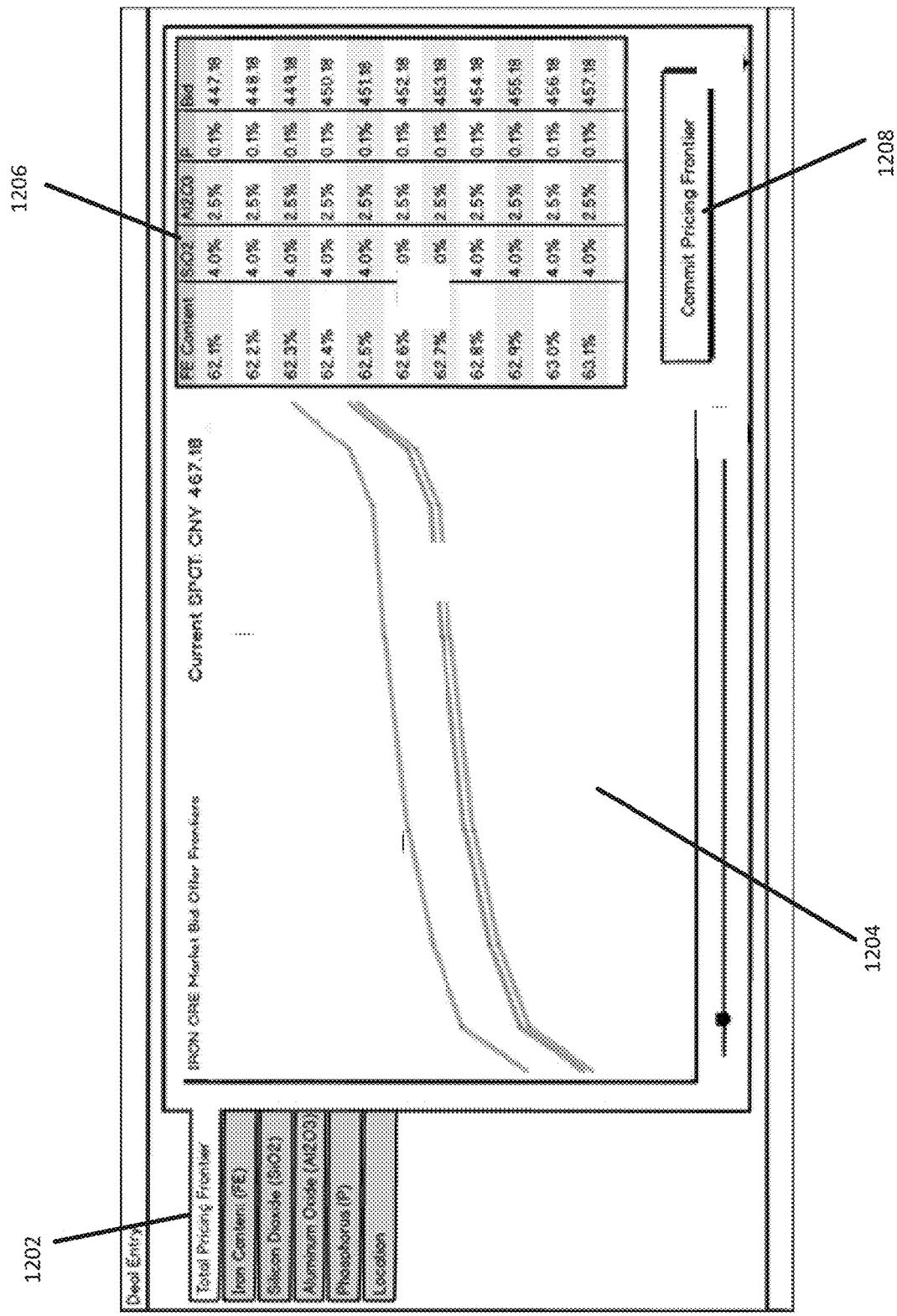
FIG. 12 depicts an example graphical user interface for generating a price frontier.

FIG. 12 depicts a view of the price frontier graph. FIG. 12 includes an aggregation window displaying a price frontier graph 1204 based on the price-attribute pair graphs 1104. In addition to the user defined price frontier, the aggregation window may also display the current aggregate price frontiers from a data feed provided by the data transaction processing system. FIG. 12 also displays a table 1206 that lists the price combination of the price frontier defined by the user. The table 1206 and graph 1204 may be adjusted by the participant to alter the bids/offsets. Once a participant has finalized the price frontier, the user selects the commit pricing frontier 1208.

Once the price frontier is finalized by the user, at act A260, a data transaction request message is generated. The data transaction request message may be generated as a function of the price frontier graph and the underlying functions and formulas used to generate the price frontier. The data transaction processing system requires a protocol by which trade messages containing the possibly tens of thousands of price points are represented in a message packet. A specification or product definition file may define the fields, headers, and other components of the message packet. The specification may define and limit the format of functions used to define the multi-dimensional order that represents the price combination defined by the price frontier created by the participant. The message may include the coefficients of step functions for the pricing frontiers. The message protocol may also include the formats for step functions.

At act A270, the data transaction request message is transmitted to the data transaction processing system. The properly formatted data transaction request message is indicative of the price frontiers that have been input by the participant. Using the price frontiers, the participant is able to generate and transmit a large range of bids that have granular pricing that matches the participant's evaluation of different variables or compositions for the commodity.

In an example workflow, a sample price frontier may be generated for a nonstandard market for a sample metallic ore. The metallic ore market includes multiple different variables from which the value of the metallic ore may be derived. In this example, the metallic ore includes three variables (A, B, and C) that are used to describe the composition of the metallic ore. Each participant in the marketplace may value the level of each variable differently and as such may assign a different price to offsets from a standardized value. Higher levels of A and lower levels of B and C may be most desirable to most participants in the market. In this example, the percentage compositions of A, B, and C are denominated and rounded to 0.5%. For example, a delivery including metallic ore comprising 60.4% A would be rounded up and considered equivalent to 60.5% A metallic ore.

A benchmark unit may be defined by the data transaction processing system and may be agreed upon by each and all participants. The benchmark unit is used as an anchor from which offset described in the price frontiers are generated from. Any benchmark unit may be used. For example, in this example, the benchmark unit may be metallic ore that includes 60% A, 10% B, and 5% C. In an embodiment, a benchmark unit may not be defined, but rather the value imputed explicitly into the price frontiers.

In an example price frontier, an interface for a participant may transmit a price frontier using a message format described below. The price frontier describes the price points that the participant is willing to pay for the metallic ore. A sample function could be: Price Frontier=$P+[(A-0.60)*X+(B-0.10)*Y+(C-0.10)*Z)]$. P is a benchmark price (e.g. what would be considered the price under a single commodity marketplace). The variables A, B, C and X, Y, and Z describe the composition of the ore and the premiums that the participant is willing to pay for each respective variable. For example, in the function, the participant is willing to pay X premium for any percentage of A over 60%. Similarly, the participant is willing to pay Y premium for any percentage of B over 10%. X, Y, and Z may be set to positive or negative values so that the participant may select to pay more or less depending on the participants desires.

Using the interface, the participant can enter and manipulate X, Y, and Z. By adjusting X, Y, and Z, the participant adjusts the total price for the metallic ore that they are willing to purchase. In a standardized system, the participant may be locked into a specific grade of ore and specific premiums and discounts. Using a price frontier, the participant is able to bid exactly where they would like to be. Standardized premiums and discounts may still be used by the participants if they would like to use the standard premiums and discounts, but they do not have to. The flexibility allows a participant to exclude specific grades of metallic ore that they cannot handle or are not profitable while bidding more for specific grades that, for example, their smelter may be configured to handle.

The example price frontier generated above is described above using a simple function. Each of the variables X, Y, and Z may nest more complexity. For example, X may represent multiple different variables or may be dependent on the value of Y. The complexity of the price frontier may be limited by the interface and the messaging systems. The price frontier may also be limited by the size of the market place. Each commodity variable A, B, C, etc. may be limited using step sizes. In the example described above, the step size of A may be limited to 0.5% steps. Each commodity variable A, B, C, etc. may also be limited by a maximum and minimum bound. A, for example, may range from 50% to 70%. Given these ranges and the 0.5% step size, the total possible A values may be 40 (50, 50.5, 51, . . . 70). If there are 30 possible B values and 20 possible C values the total number of possible combinations is 40×30×20 or 24,000. The price frontier described above $P+[(A-0.60)*X+(B-0.10)*Y+(C-0.10)*Z)]$ as such provides 24,000 price points at which the participant would be willing to purchase the metallic ore. If the participant does not wish to participate at each of these levels, the participant may adjust the price frontier to exclude certain ranges or combinations. For example, the participant may set the price frontier to only include values of A from 60% to 64% and values of B from 8% to 10%.

The complexities a price frontier may be limited by the messaging format defined by the transaction processing system. A simple system may limit the participants to using coefficients for each variable. This is described in the example above where $P+[(A-0.60)*X+(B-0.10)*Y+(C-0.10)*Z)]$. The messaging format may include fields for X, Y and Z. Additional fields may be added for ranges of values. A more complex messaging system may provide additional fields or bytes that allow the interface and the data transaction processing system to generate and interpret more complex interactions between the variables. Each commodity may be unique, e.g. Iron Ore is different than grain which is different than crude. Certain variables for different markets may be more or less important to participants and therefore may involve more complex calculations and pricing mechanisms.

XIII. CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method for generating an electronic data transaction request message comprising a multi-dimensional order, the method comprising:
    displaying, by a processor, an interactive graphical user interface rendered on a display coupled to the processor;
    receiving a first variable and a second variable as input from a user via first and second input controls presented via the interactive graphical user interface;
    identifying, by the processor, a specification for a non-standardized data object, the specification describing at least the first variable and the second variable, the first variable and the second variable for use in processing the multi-dimensional order, the specification defining a plurality of possible combinations of the first variable and the second variable, the first variable and the second variable including an attribute of the non-standardized data object being different from price, and the value of the non-standardized data object being derived from the first variable and the second variable, wherein each combination of the plurality of combinations is indicative of a unique set of order parameters for the non-standardized data object;
    generating, by the processor, a digital dashboard for the first variable and second variable;
    displaying, by the processor, in the interactive graphical user interface, the generated digital dashboard comprising:
        a plurality of graphical data objects for the first variable and the second variable associated with the multi-dimensional order, each graphical data object describing a price curve graph;
        a graphical aggregation data object describing a price frontier graph based on the price curve graphs from the plurality of graphical data objects, the graphical aggregation data object representative of the plurality of possible combinations of the first variable and the second variable;
        a price-variable table translating the price frontier graph to a data set; and
        a formula field indicative of the specification for the non-standardized data object,
        wherein the price curve graphs, the price-variable table, and the formula field are operative to be adjusted by the user via the interactive graphical user interface, and
        wherein the price curve graphs, the price-variable table, and the formula field are linked to each other;
    receiving, by the processor, a first input for the first variable and a second input for the second variable via the interactive graphical user interface by the user;
    updating, by the processor, the one or more of the price curve graphs as a function of the first input and the second input;
    generating, by the processor, an updated price frontier graph, price-variable table, and formula field for the non-standardized data object as a function of the one or more updated price curve graphs;
    generating, by the processor, an electronic multi-dimensional data transaction request message as a function of the price frontier graph, the electronic multi-dimensional data transaction request message formatted according to the specification and comprising a smaller data size than a total data size of a plurality of electronic request messages, each for a different one of the plurality of combinations of the first and second variables; and
    transmitting the formatted electronic multi-dimensional data transaction request message to a data transaction processing system over a network in lieu of transmitting the plurality of electronic request messages, each for a different one of the plurality of combinations of the first and second variables, wherein less data is thereby transmitted over the network to the data transaction processing system.

2. The computer implemented method of claim 1, wherein the specification is provided by the data transaction processing system.

3. The computer implemented method of claim 1, wherein the specification further describes a first range for the first variable and a second range for the second variable.

4. The computer implemented method of claim 1, wherein the first input and the second input relate to user defined premiums for the first variable and second variable.

5. The computer implemented method of claim 1, wherein the one or more price curve graphs include data relating to a market data feed provided by the data transaction processing system.

6. The computer implemented method of claim 5, wherein the market data feed comprises a fitted curve.

7. The computer implemented method of claim 1, wherein the first input and second input are input into the price-variable table that is used to generate the one or more price curve graphs.

8. The computer implemented method of claim 1, wherein the first input and second input are input using a capacitive sensor.

9. The computer implemented method of claim 1, wherein the multi-dimensional data transaction request message uses a format defined by the data transaction processing system.

10. A computer implemented method for facilitating trading of a non-standardized data object being transacted by an electronic data transaction processing system, the computer implemented method comprising:
    displaying, by a processor, an interactive graphical user interface rendered on a display coupled to the processor;

receiving a first variable and a second variable as input from a user via first and second input controls presented via the interactive graphical user interface;

identifying, by the processor, a specification for the non-standardized data object, the specification describing a plurality of attributes associated with an electronic data transaction request message and the specification defining a plurality of possible combinations of the plurality of attributes, the value of the non-standardized data object being derived from the plurality of attributes, and the plurality of attributes including attributes for the non-standardized data object being different from price, wherein each combination of the plurality of combinations is indicative of a unique set of order parameters for the non-standardized data object;

presenting, by the processor, in the interactive graphical user interface, a digital dashboard, the digital dashboard comprising:
- a plurality of graphical data objects for each of the plurality of attributes associated with the electronic data transaction request message, each graphical data object describing a price-attribute pair graph;
- a graphical aggregation data object describing a price frontier graph based on the price-attribute pair graphs from the plurality of graphical data objects, the graphical aggregation data object representative of the plurality of possible combinations of the plurality of attributes;
- a price-variable table translating the price frontier graph to a data set, and
- a formula field indicative of the specification for the non-standardized data object,
- wherein the price-attribute pair graphs, the price-variable table, and the formula field are operative to be adjusted by the user via the interactive graphical user interface, and
- wherein the price-attribute pair graphs, the price-variable table, and the formula field are linked to each other;

adjusting, by the processor, one or more of the price-attribute pair graphs as a function of an input received via the graphical user interface;

generating, by the processor, an updated price frontier graph, price-variable table, and formula field for the non-standardized data object based on the adjusted one or more of the price-attribute pair graphs;

generating, by the processor, an electronic multi-dimensional data transaction request message as a function of the updated price frontier graph, the multi-dimensional data transaction request message formatted according to the specification and comprising a smaller data size than a total data size of a plurality of electronic request messages, each for a different one of the plurality of combinations of the first and second variables; and transmitting, by the processor, the formatted electronic multi-dimensional data transaction request message to the data transaction processing system over a network in lieu of transmitting a plurality of electronic request messages, each for a different one of the plurality of combinations of the plurality of attributes, wherein less data is thereby transmitted over the network to the data transaction processing system.

11. The computer implemented method of claim 10, wherein the specification is provided by the data transaction processing system.

12. The computer implemented method of claim 11, wherein the specification further describes a range of permissible values for the plurality of attributes.

13. The computer implemented method of claim 10, wherein the input relates to user defined premiums for the plurality of attributes.

14. The computer implemented method of claim 10, wherein the price-attribute pair graphs include data relating to a market data feed provided by the data transaction processing system.

15. The computer implemented method of claim 14, wherein the market data feed comprises a fitted curve.

16. The computer implemented method of claim 10, wherein the input is acquired using a capacitive sensor.

17. A computer system for generating an electronic data transaction request message comprising a multi-dimensional order, the computer system comprising:
- means for displaying, an interactive graphical user interface rendered on a display;
- means for receiving a first variable and a second variable as input from a user via first and second input controls presented via the interactive graphical user interface;
- means for identifying a specification for a non-standardized data object, the specification describing parameters for a plurality of variables for the non-standardized data object, the plurality of variables for use in processing the multi-dimensional order and the specification defining a plurality of possible combinations of the plurality of variables, the plurality of variables including a plurality of attributes for the non-standardized data object being different from price, and the value of the non-standardized data object being derived from the plurality of variables, wherein each combination of the plurality of combinations is indicative of a unique set of order parameters for the data object;
- means for generating one or more price curve graphs for the plurality of variables as a function of a user input received via the interactive graphical user interface;
- means for displaying the one or more price curve graphs in the interactive graphical user interface;
- means for displaying a price-variable table translating the one or more price curve graphs to a data set in the interactive graphical user interface;
- means for displaying a formula field indicative of the specification for the non-standardized data object in the interactive graphical user interface,
    - wherein the one or more price curve graphs, the price-variable table, and the formula field are operative to be adjusted by the user via the interactive graphical user interface, and
    - wherein the one or more price curve graphs, the price-variable table, and the formula field are linked to each other;
- means for generating a price frontier graph, price-variable table, and formula field for the non-standardized data object as a function of the one or more price curve graphs, the price frontier graph representative of the plurality of possible combinations of the plurality of variables;
- means for generating an electronic multi-dimensional data transaction request message as a function of the price frontier graph, the multi-dimensional data transaction request message formatted according to the specification and comprising a smaller data size than a total data size of a plurality of electronic request messages, each for a different one of the plurality of combinations of the first and second variables; and means for transmitting the formatted electronic multi-dimensional data transaction request message to a data transaction processing system over a network in lieu of transmitting a plurality of electronic request messages, each for a different one of the plurality of combinations of the plurality of variables, wherein less data is thereby transmitted over the network to the data transaction processing system.

18. The computer system of claim 17, wherein the specification defines a range of permissible values for the plurality of attributes.

19. The computer system of claim 17, wherein the one or more price curve graphs are generated using a user input function.

20. The computer system of claim 19, wherein the user input function describes user defined premiums for the plurality of attributes.

* * * * *